(12) United States Patent
Broggi

(10) Patent No.: US 11,205,068 B2
(45) Date of Patent: *Dec. 21, 2021

(54) SURVEILLANCE CAMERA SYSTEM LOOKING AT PASSING CARS

(71) Applicant: Ambarella International LP, Santa Clara, CA (US)

(72) Inventor: Alberto Broggi, Parma (IT)

(73) Assignee: Ambarella International LP, Santa Clara, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/676,767

(22) Filed: Nov. 7, 2019

(65) Prior Publication Data

US 2021/0142055 A1    May 13, 2021

(51) Int. Cl.
*G06K 9/00* (2006.01)
*G08B 13/196* (2006.01)
*G08G 1/01* (2006.01)

(52) U.S. Cl.
CPC ... *G06K 9/00503* (2013.01); *G08B 13/19656* (2013.01); *G08B 13/19665* (2013.01); *G08G 1/01* (2013.01); *G08B 13/19641* (2013.01)

(58) Field of Classification Search
CPC .. G08B 13/19641; G08G 1/01; G08G 1/0175; G08G 1/0133; G08G 1/017; G06K 9/00785; H04M 1/72463
See application file for complete search history.

(56) References Cited

U.S. PATENT DOCUMENTS

| | | | | |
|---|---|---|---|---|
| 2013/0138591 A1* | 5/2013 | Ricci | ............ | G06F 3/0481 706/46 |
| 2013/0144461 A1* | 6/2013 | Ricci | ............ | B60W 40/04 701/1 |
| 2014/0168436 A1* | 6/2014 | Pedicino | ............ | G06Q 40/08 348/148 |
| 2015/0054639 A1* | 2/2015 | Rosen | ............ | H04M 3/2281 340/439 |
| 2016/0046298 A1* | 2/2016 | DeRuyck | ............ | B60W 50/14 340/576 |

* cited by examiner

*Primary Examiner* — Mirza F Alam
(74) *Attorney, Agent, or Firm* — Christopher P. Maiorana, PC

(57) ABSTRACT

An apparatus including an interface and a processor. The interface may be configured to receive video frames. The processor may be configured to perform video operations on the video frames to detect objects in the video frames, detect a license plate and a driver of the vehicle based on the objects detected in the video frames, detect a use of an electronic device by the driver and generate a notification signal. The notification signal may comprise data to enable correlating the driver using the electronic device in the vehicle with the license plate. The notification signal may be generated if the use of the electronic device is unauthorized. The processor may comprise a dedicated hardware module configured to perform feature detection to calculate descriptors for determining a likelihood that pixels of the video frames belong to the objects that correspond to the use of the electronic device by the driver.

20 Claims, 14 Drawing Sheets

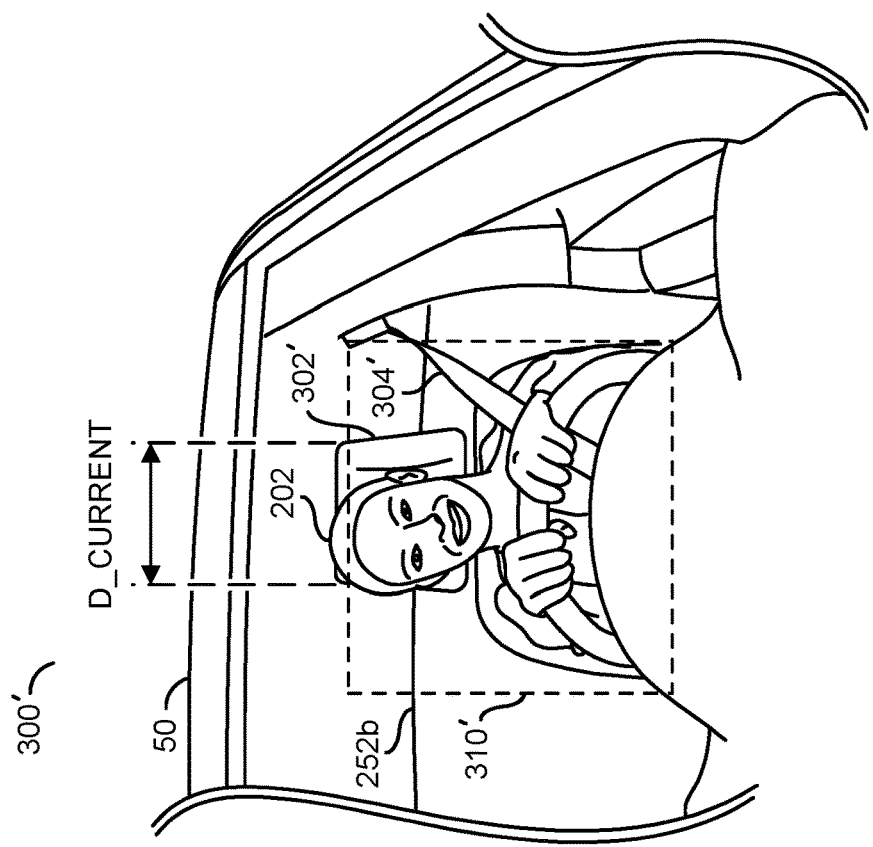
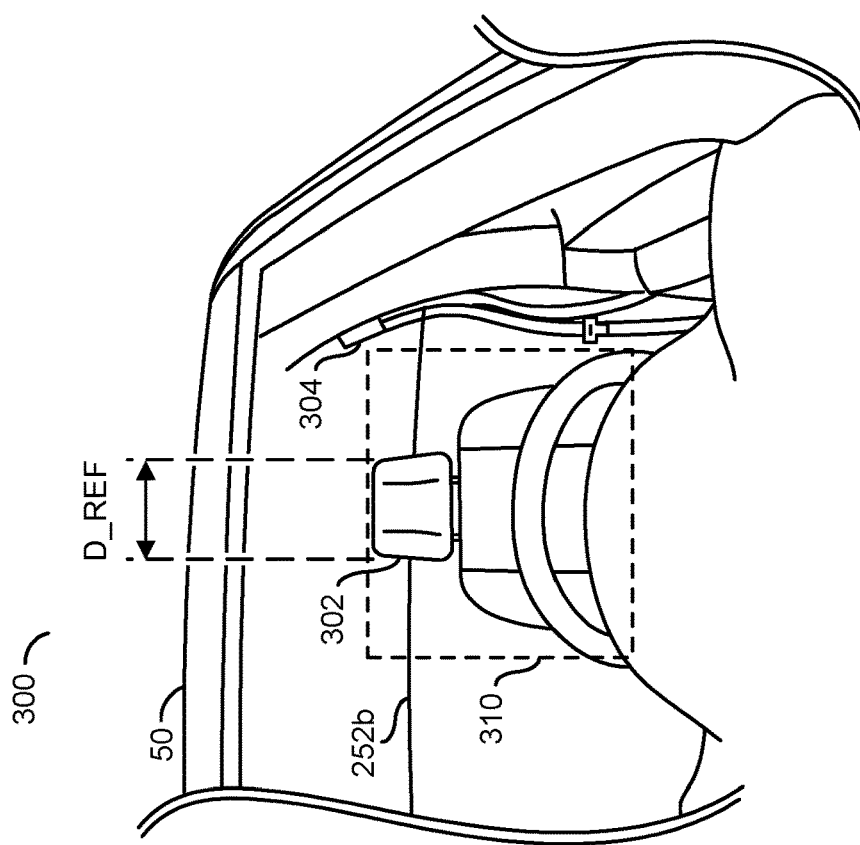
FIG. 3

FIG. 13

```
750
  752
  START
   ↓
754 PERFORM COMPUTER VISION
    OPERATIONS ON PORTION OF
    VIDEO FRAME SHOWING
    INTERIOR OF VEHICLE
   ↓
756 DETERMINE LOCATIONS OF
    HANDS OF DRIVER
   ↓
758 IS A HAND NEAR EAR? --NO--> 760 DECREASE CONFIDENCE LEVEL OF UNAUTHORIZED USE
   |YES
762 INCREASE CONFIDENCE LEVEL OF UNAUTHORIZED USE --> 764 SEARCH FOR PHONE IN VEHICLE INTERIOR
                                                           ↓
766 IS PHONE IN HAND OF DRIVER? --NO--> 768 DECREASE CONFIDENCE LEVEL OF UNAUTHORIZED USE
   |YES
770 INCREASE CONFIDENCE LEVEL OF UNAUTHORIZED USE --> 772 ANALYZE MOUTH OF DRIVER
                                                           ↓
                                                       774 IS MOUTH OPEN?
778 DECREASE CONFIDENCE LEVEL OF UNAUTHORIZED USE <--NO--
                                                           |YES
                                                       776 INCREASE CONFIDENCE LEVEL OF UNAUTHORIZED USE
   ↓                                                       ↓
780 END
```

SURVEILLANCE CAMERA SYSTEM LOOKING AT PASSING CARS

FIELD OF THE INVENTION

The invention relates to computer vision generally and, more particularly, to a method and/or apparatus for implementing a surveillance camera system looking at passing cars.

BACKGROUND

Mobile phone usage is increasingly becoming a factor in vehicle collisions. While it is well known that usage of mobile phones are a distraction to drivers, many drivers still take the risk of using a mobile phone while driving. Many locations have laws against distracted driving. If a police officer catches a driver using a mobile phone, the driver may be fined or get a license suspension. Even with police enforcement mobile phone usage while driving persists.

Police can only enforce when they witness mobile phone usage. Police resources are limited compared to the widespread problem of mobile phone usage while driving. Police cannot monitor all locations all the time for mobile phone usage. Drivers know that they can get away with phone usage when police are not present.

It would be desirable to implement a surveillance camera system looking at passing cars.

SUMMARY

The invention concerns an apparatus including an interface and a processor. The interface may be configured to receive video frames. The processor may be configured to perform video operations on the video frames to detect objects in the video frames, detect a license plate of a vehicle and a driver of the vehicle based on the objects detected in the video frames, detect a use of an electronic device by the driver and generate a notification signal. The notification signal may comprise data to enable correlating the driver using the electronic device in the vehicle with the license plate. The notification signal may be generated if the use of the electronic device is unauthorized. The processor may comprise a dedicated hardware module configured to perform feature detection to calculate descriptors for determining a likelihood that pixels of the video frames belong to the objects that correspond to the use of the electronic device by the driver.

BRIEF DESCRIPTION OF THE FIGURES

Embodiments of the invention will be apparent from the following detailed description and the appended claims and drawings.

FIG. 3 is a diagram illustrating an object comparison between a reference video frame and a captured video frame.

FIG. 13 is a flow diagram illustrating a method for detecting unauthorized use of an electronic device.

DETAILED DESCRIPTION OF THE EMBODIMENTS

Figure 1:
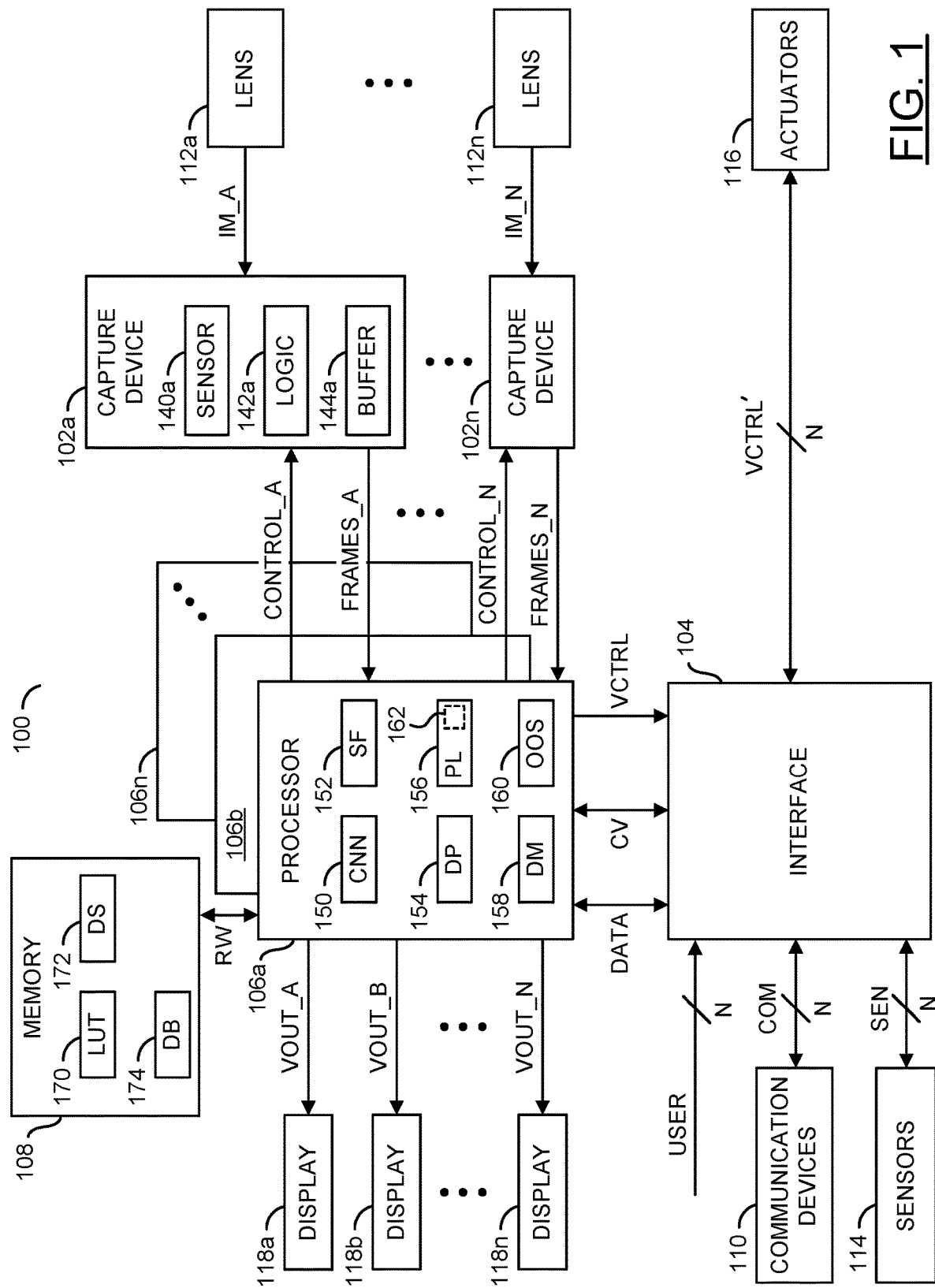
FIG. 1 is a diagram illustrating an embodiment of the present invention.

Embodiments of the present invention include providing surveillance camera system looking at passing cars that may (i) implement computer vision to monitor a driver, (ii) distinguish between a driver and other vehicle passengers, (iii) infer smartphone usage based on driver behavior, (iv) distinguish mouth movements for phone use from conversation with another passenger, (v) monitor for texting and/or other distractions, (vi) associate a driver with a vehicle license plate, (vii) contact authorities if unauthorized use is detected and/or (viii) be implemented as one or more integrated circuits.

Embodiments of the invention may be configured to implement computer vision operations on video frames to detect cell phone usage while driving. In some embodiments, a notification signal may be generated to provide information to authorities that cell phone usage has been detected. Notification to authorities may aid in enforcement to help improve road safety by reducing distracted driving. For example, the notification may provide a the authorities a license plate and images (or video) of the driver performing the unauthorized cell phone use instead of automatically issuing a ticket to ensure that the computer vision operations have properly identified unauthorized usage of an electronic device. Furthermore, implementing computer vision may provide immediate feedback and/or continuous monitoring (e.g., compared to law enforcement, which may be limited to stopping drivers that are seen by traffic enforcement officers).

The video frames may be captured by one or more video cameras directed to the interior of a vehicle. The computer vision operations may be performed on the captured video frames to detect the smartphone being held by the driver. In some embodiments, the computer vision operations may perform various heuristics to infer whether the smartphone is being used. The heuristics may be based on the behavior of the driver.

In one example, even if the smartphone is not visible, the computer vision operations may detect whether the hand of the driver is close to the ear (e.g., a common position when talking on the phone). The computer vision operations may be configured to detect how long the hand has been held to the ear (e.g., distinguish between other behaviors such as resting a hand on the head, or scratching at the head). In one example, if the hand has been placed near the ear for a threshold amount of time (e.g., TS) then the inference may be made that the driver is talking on the phone.

Other types of behavior may be detected. For example, the movements of the head and/or face may be analyzed. Detecting mouth movements may be used to infer that the driver is speaking. Other movements of the head, such as nodding may be detected.

Embodiments of the invention may be configured to aggregate various detections made using the computer vision operations. If enough evidence has been detected to infer that the driver is using the cell phone while driving, a notification may be provided to a pre-determined destination. In some embodiments, the pre-determined destination may comprise the authorities (e.g., for police enforcement). In some embodiments, the pre-determined destination may be to a vehicle owner (e.g., to provide parents a notification if a child is using a cell phone while driving). In some embodiments, the pre-determined destination may be the driver (e.g., to instruct the driver to put the phone down and pay attention to the road).

In some embodiments, video capture devices may be implemented at fixed locations (e.g., on traffic lights, on street lights, on street signs, on billboards, etc.) to capture video of passing cars. In some embodiments, video capture devices may be implemented on an ego vehicle to capture video of other vehicles on the road. A fixed location may provide a better vantage point to capture images of drivers to analyze. A mobile camera mounted on a vehicle may not always be able to capture a useful image of the driver to monitor for cell phone usage, but may be able to provide monitoring from variable locations.

Embodiments of the present invention may capture video frames of license plates on a vehicle and/or the driver of the vehicle. In some embodiments, optical character recognition (OCR) may be implemented. The image quality may be sufficient to enable the license plate characters to be human-readable (e.g., to enable a person to double-check results). Video operations may be implemented to analyze whether the driver is interacting with an electronic device (e.g., holding a smart phone up to the ear, texting, watching video, etc.). The video operations may be implemented by using a convolutional neural network that has been appropriately trained to discriminate between regular poses of a driver and a pose of a driver with the hand holding a phone close to the ear. In an example, when the video operations performed positively detect unauthorized use of an electronic device while driving, the picture (of the driver using the smartphone and the license plate) may be sent to the authorities. The pictures may be sent to enable the authorities to double-check the results of the video operations before issuing a ticket.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or blocks (or circuits) 118a-118n. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal qv, the signal RW and/or the signal VCTRL may be generated based on one or more decisions made by the processors 106a-106n. The decisions made by the processors 106a-106n may be determined based on data received by the processors 106a-

106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision operations implemented by the CNN module 150 may be described in association with FIG. 4.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRA- MES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118*a*-118*n* (e.g., the signal VOUT_A-VOUT_N).

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118*a*-118*n*. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118*a* as the signal VOUT_A. In another example, the decision making module 158 may determine which of the displays 118*a*-118*n* to use to display a notification (e.g., an advertisement) and/or where on the video data to place the notification. In yet another example, the decision making module 158 may adjust output characteristics of the displays 118*a*-118*n* (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162. The circuit 162 may implement a computer vision pipeline portion. The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
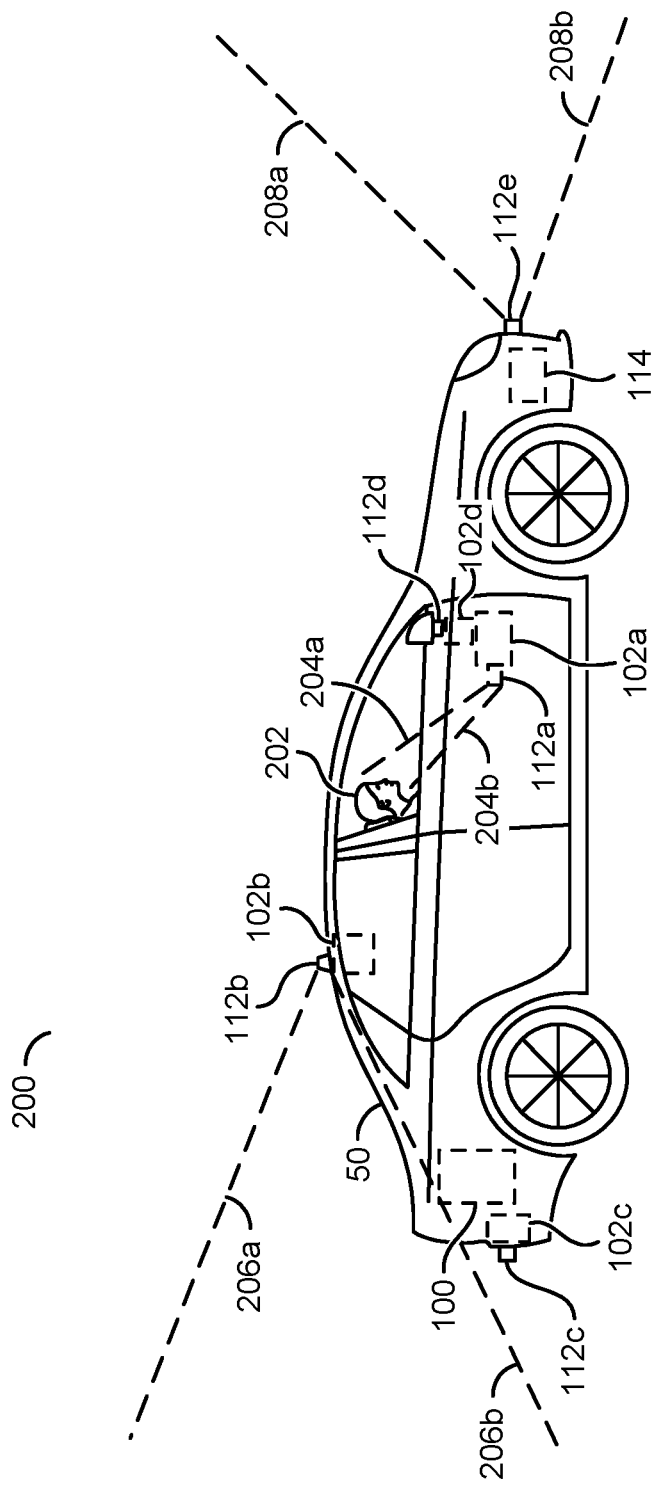
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultrasound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Referring to FIG. 3, a diagram illustrating an object comparison between a reference video frame and a captured video frame is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 4). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 4:
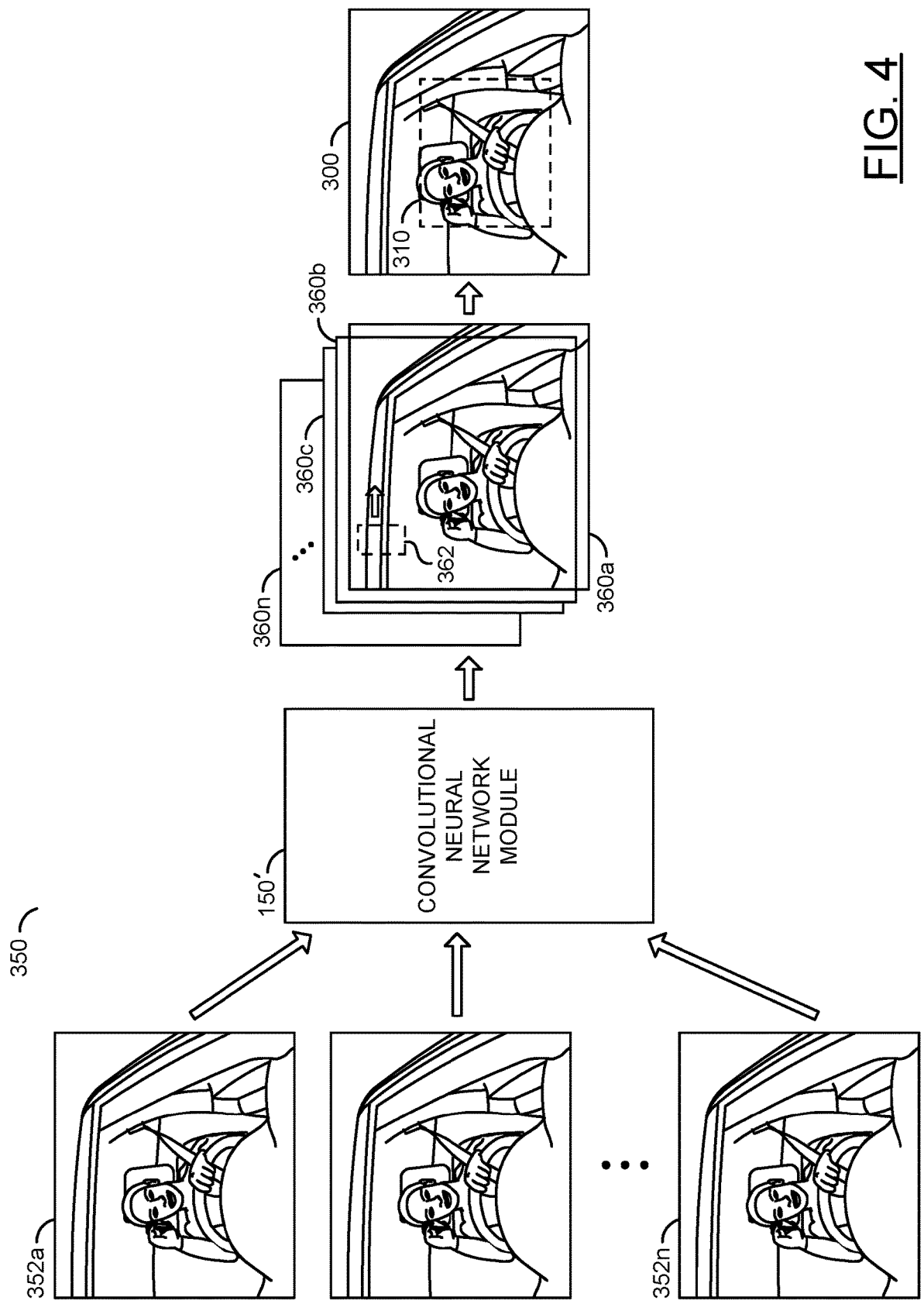
FIG. 4 is a diagram illustrating an example visualization of training a convolutional neural network for object detection using fleet learning.

Referring to FIG. 4, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an occupied interior of a vehicle (e.g., of a driver holding a smartphone). For example, the training data 352a-352n may be a sequence of video frames of a person talking on a cellular phone while driving. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In yet another example, different drivers (e.g., different people) talking while holding various models of smartphones may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 5:
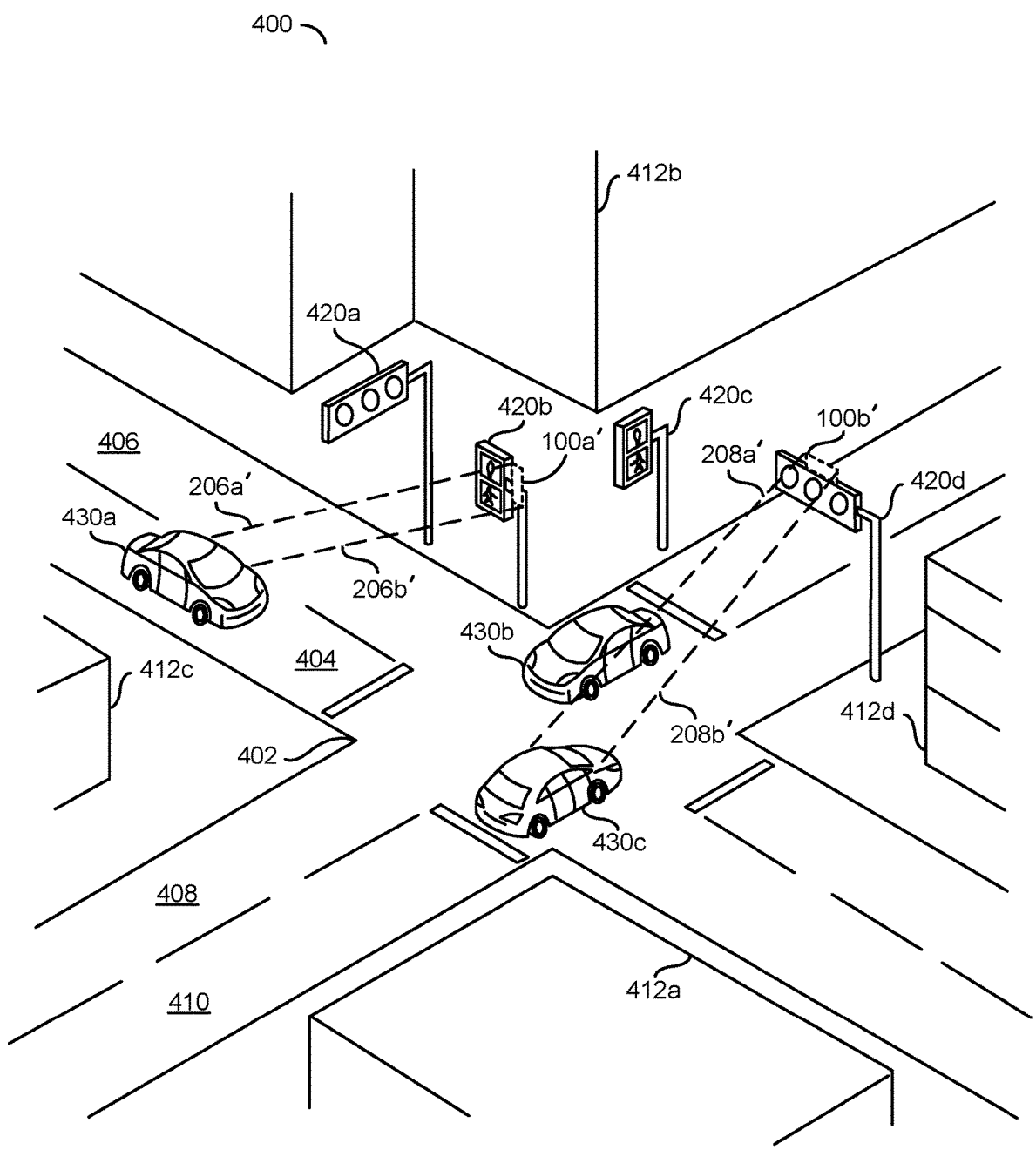
FIG. 5 is a diagram illustrating an example implementation of capturing video of vehicles from a stationary mounting location.

Referring to FIG. 5, a diagram illustrating an example implementation of capturing video of vehicles from a stationary mounting location is shown. An example scenario 400 is shown. The example scenario 400 may comprise an intersection 402. The intersection 402 may comprise two roadways meeting. The intersection 402 may comprise a lane 404 and a lane 406 of a first road intersecting with a lane 408 and a lane 410 of a second road. The lane 404 may be for traveling in an opposite direction to the lane 406 on the first road and the lane 408 may be for traveling in an opposite direction to the lane 410 on the second road. Buildings 412a-412d are shown located near the intersection 402. The layout of the intersection 402 and/or structures such as the buildings 412a-412d may be a representative example of a scenario where the apparatus (or camera system) 100 may be implemented.

Fixed structures 420a-420d are shown. In the example scenario 400, the fixed structure 420a may be a set of traffic lights, the fixed structure 420b may be pedestrian crossing lights, the fixed structure 420c may be pedestrian crossing lights and the fixed structure 420d may be a set of traffic lights. The fixed structures 420a-420d may be representative examples of fixed structures for mounting the camera system 100. Other fixed structures (e.g., 420a-420n, not shown) may be implemented. In one example, the fixed structures 420a-420n may comprise street lamps, billboards, mailboxes, street signs, telephone/utility poles, etc. In another example, the buildings 412a-412d may be one or more of the fixed structures 420a-420n used to mount the camera system 100. Generally, the fixed structures 420a-420n may comprise objects that may be stationary (or not moved often, such as a street sign that may be replaced occasionally) and/or may provide a vantage point for mounting the camera system 100.

The camera system 100a' is shown mounted on the fixed structure 420b. The camera system 100a' is shown having the field of view 206a'-206b'. The camera system 100b' is shown mounted on the fixed structure 420d. The camera system 100b' is shown having the field of view 208a'-208b'. Other camera systems may be implemented (e.g., the camera systems 100a'-100n', not shown). The camera systems 100a'-100b' may be generally implemented similar to the apparatus 100 shown in association with FIG. 1. Some of the fixed structures 420a-420n may not have the camera system 100 mounted. The camera systems 100a'-100n' may implement a fixed surveillance camera system configured to look at passing cars. The number of the camera systems 100a'-100n' implemented and/or the fixed structures 420a-420n that have the camera system 100 mounted may be varied to provide video capture coverage of the as desired for a particular location.

A vehicle 430a, a vehicle 430b and a vehicle 430c are shown. The vehicle 430a is shown approaching the intersection 402 in the lane 404. The vehicle 430b is shown driving in the intersection 402 in the lane 408. The vehicle 430c is shown driving in the intersection 402 in the lane 410. While three vehicles 430a-430c are shown in the example scenario 400, the apparatus 100 may be configured to capture and/or analyze any number of vehicles (e.g., 430a-430n, not shown).

The apparatus 100 may be configured to capture video data of the vehicles 430a-430n. The apparatus 100 may be configured to capture a license plate and a windshield of the vehicles 430a-430n (to be described in more detail in association with FIG. 6). The field of view 206a'-206b' of the camera system 100a' may be directed at a front of the vehicle 430a. The field of view 208a'-208b' of the camera system 100b' may be directed at a front of the vehicle 430c. The vehicle 430b may be facing away from the camera systems 100a'-100b' (e.g., another one of the camera systems 100a'-100n' may have to be implemented to provide full coverage of vehicles in the intersection 402). By capturing video data of the front of the vehicle 430a and the vehicle 430c, the camera systems 100a'-100b' may be configured to capture video data and/or perform video operations to detect the license plate and/or determine whether there is unauthorized use of an electronic device.

In the example scenario 400, the camera systems 100a'-100b' are shown mounted to the fixed structures 420a-420d (e.g., one instance of the apparatus 100 is mounted and may operate independently). In some embodiments, the apparatus 100 may be implemented at one location (e.g., in a building, in a utility box, on one of the fixed structures 420a-420n, etc.), and the capture devices 102a-102n and/or the lenses 112a-112n may be mounted on the fixed structures 420a-420n. For example, images captured by multiple capture devices 102a-102n may be communicated to one instance of the apparatus 100 that may be configured to perform video analysis (e.g., multiple capture devices 102a-102n may operate dependent on one apparatus 100). The installation of the apparatus 100 for implementations that use the fixed structures 420a-420n as mounting points may be varied according to the design criteria of a particular implementation.

Figure 6:
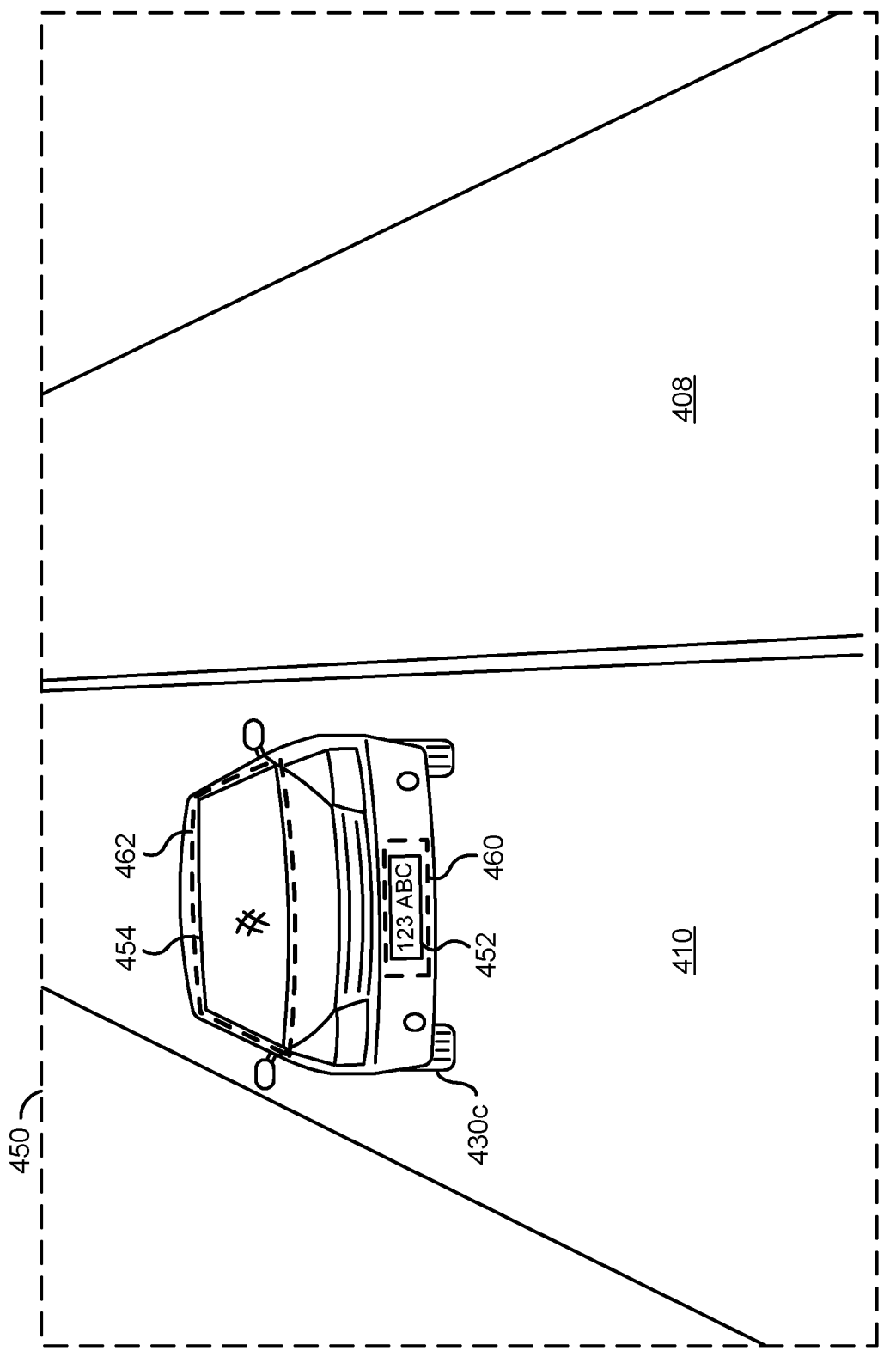
FIG. 6 is a diagram illustrating computer vision operations performed on an example video frame to capture a windshield area and a license plate of a vehicle.

Referring to FIG. 6, a diagram illustrating computer vision operations performed on an example video frame to capture a windshield area and a license plate of a vehicle is shown. An example video frame 450 is shown. The example video frame 450 may be a representative example of one of the video frames FRAMES_A-FRAMES_N captured by one of the capture devices 102a-102n. While the video frame 450 is shown to illustrate computer vision operations performed to detect and/or recognize objects, the computer vision operations may operate on and/or make determinations based on more than one video frame.

The video frame 450 may be an example of a full video frame. The video frame 450 may be an example of a high resolution video frame (e.g., a 1080P video frame, a 4K video frame, an 8K video frame, etc.). The processors 106a-106n may be configured to perform computer vision operations on the entire video frame 450 and/or on portions of the full video frame 450. The processors 106a-106n may be configured to perform digital zooming, dewarping, oversampling and/or cropping to generate a high quality portion of the full video frame 450 in order to reduce the size of the search area used to detect particular objects.

The lane 408 and the lane 410 are shown in the video frame 450. The video frame 450 may comprise the vehicle 430c traveling in the lane 410. In one example, the video frame 450 may be one of the video frames FRAMES_A-FRAMES_N captured and/or analyzed by the camera system 100b' shown in association with FIG. 5. A license plate 452 is shown on the vehicle 430c. A windshield 454 is shown on the vehicle 430c.

In some embodiments, the video frame 450 may be a video frame captured by the apparatus 100 mounted on one of the fixed locations 420a-420n. In one example, the fixed locations 420a-420n may provide a high level vantage point to capture the license plate 452 and/or the windshield 454. In another example, the fixed locations 420a-420n may provide a low level vantage point (e.g., attached to a fixed location 420a-420n such as a mailbox) to capture the license plate 452 and/or to help see within the vehicle 430c through the windshield by providing a more head-on view of the windshield 454.

In some embodiments, the apparatus 100 may be implemented by the ego vehicle 50. In one example, the ego vehicle 50 may travel in the lane 410 and capture video frames of the vehicle 430c (e.g., from the rear lens 112c while traveling in the same direction and in front of the vehicle 430c). In another example, the ego vehicle 50 may travel in the lane 408 and capture the vehicle 430c (e.g., from the front lens 112e while traveling in the opposite direction to the vehicle 430c). In yet another example, the ego vehicle 50 may travel through the intersection 402 perpendicular to the vehicle 430c and use a side-mounted lens to capture the video frame 450. Capturing the video frame with the apparatus 100 implemented in the ego vehicle 50 may enable a low vantage point to capture the license plate 452 and/or to see within the vehicle 430c through the windshield 454.

Implementing the camera system 100 in the ego vehicle 50 may enable the camera system 100 to be movable (e.g., capture video data at various locations). Implementing the camera system 100 in the ego vehicle 50 may enable the camera system 100 to follow a particular driver to monitor for unauthorized use of an electronic device over time.

A dotted box 460 is shown. The dotted box 460 may represent the computer vision operations performed by the processors 106a-106n to detect the license plate 452. The CNN module 150 may be configured to detect features and/or descriptors in the example video frame 450 and compare the features and/or descriptors against the features and/or descriptors learned from the training data 352a-352n in order to recognize the portion of the video frame 450 that corresponds to the license plate 452. In some embodiments, the computer vision operations performed by the processors 106a-106n may comprise OCR. In the example shown, using the OCR, the processors may perform the license plate detection 460 and read the characters '123 ABC' from the license plate 452.

A dotted shape 462 is shown. The dotted shape 462 may represent the computer vision operations performed by the processors 106a-106n to detect the windshield 454. The CNN module 150 may be configured to detect features and/or descriptors in the example video frame 450 and compare the features and/or descriptors against the features and/or descriptors learned from the training data 352a-352n in order to recognize the portion of the video frame 450 that corresponds to the windshield 454.

The processors 106a-106n may be configured to perform the windshield detection 462 to perform the computer vision operations on objects detected within the vehicle 430c. Performing the computer vision operations on the interior of the vehicle 430c through the windshield 454 may enable the processors 106a-106n to detect unauthorized use of an electronic device. Details of detecting objects and determining unauthorized use of an electronic device may be described in association with FIGS. 7-9). In the example shown, the interior of the vehicle 430c may be analyzed through the windshield 454. However, depending on the vantage point of the capture devices 102a-102n the interior of the vehicle 430c may be analyzed through any of the windows on the vehicle 430c. In an example, if the apparatus 100 is mounted on the ego vehicle 50 driving in the lane 408, one of the lenses 112a-112n mounted on the side of the ego vehicle 50 may capture images of the driver 202 of the vehicle 430c through the driver side window (e.g., as the vehicle 430c and the ego vehicle 50 pass each other). Whether the computer vision operations performed by the processors 106a-106n are performed on the interior of the vehicle 430c analyzed through the windshield 454 or any other of the windows of the vehicle 430c may be varied according to the design criteria of a particular implementation.

To reduce the amount of computations performed, the processors 106a-106n may be configured to first detect the vehicle 430c in the video frame 450 and then search the subset of the video frame 450 that corresponds to the location of the vehicle 430c to search for the license plate 452 and the windshield 454. The license plate 452 and the windshield 454 may not be detected in the video frame 450 outside of the boundaries of a vehicle. So the processors 106a-106n may limit the search area for the license plate 452 and the windshield 454 to the location of the vehicle 430c instead of the entire video frame 450. In an example, the processors 106a-106n may perform a more general search (e.g., using less computational power than searching for a smaller shape such as the license plate 452 and/or the windshield 454) to detect shapes that correspond to the vehicle 430c. When the vehicle 430c is detected, the rest of the video frame 450 may be masked (or ignored) and the processors 106a-106n may perform a more detailed search (e.g., using more computational power) only on the sub-region of the video frame 450 that comprises the vehicle 430c (e.g., compared to using the high computational search on the entire video frame 450). Limiting the search for the license plate 452 and/or the windshield 454 to the portion of the video frame 450 that comprises the vehicle 430c may further prevent false positives (e.g., detecting letters from billboards, detecting windows on buildings, etc.).

In the example video frame 450, the license plate detection 460 and the windshield detection 462 may both be visible in the same video frame. In some scenarios, one video frame may not comprise both the license plate 452 and the windshield 454. The processors 106a-106n may be configured to compare video frames from multiple angles that have been captured at the same time (e.g., based on a time stamp of the captured video frame) and/or from the same location (e.g., captured temporally and geographically close together) to analyze both the license plate 452 and the interior of the vehicle 430c through the windshield 454. In an example, the processors 106a-106n may detect the vehicle 430c in one video frame and track the vehicle 430c through subsequent video frames that may be captured by the same capture device 102a-102n and/or different capture devices 102a-102n. The processors 106a-106n may be configured to compile composite information about the vehicle 430c from different video data sources to detect both the license plate 452 and determine whether there is unauthorized use of an electronic device in the vehicle 430c.

In an example, some regions (e.g., states, provinces, countries, etc.) do not require the license plate 452 to be on the front of the vehicle 430c so only one of the capture devices 102a-102n may be unable to detect both the license plate 452 and see within the vehicle 430c through the windshield 454. By performing the computer vision operations by detecting the vehicle 430c and tracking the vehicle 430c through multiple video frames, the processors 106a-106n may analyze multiple views of the vehicle 430c.

The processors 106a-106n may perform computer vision operations on video data from multiple sources to make determinations that may be unable to be made from analyzing video data from a single source alone. In some embodiments, the processors 106a-106n may be configured to perform the computer vision operations on video frames that have been stitched together (e.g., the hand 522 with the electronic device and the face 524 may be captured by two different capture devices 102a-102n). In some embodiments, the processors 106a-106n may analyze subsets and/or portions of a full video frame.

Figure 7:
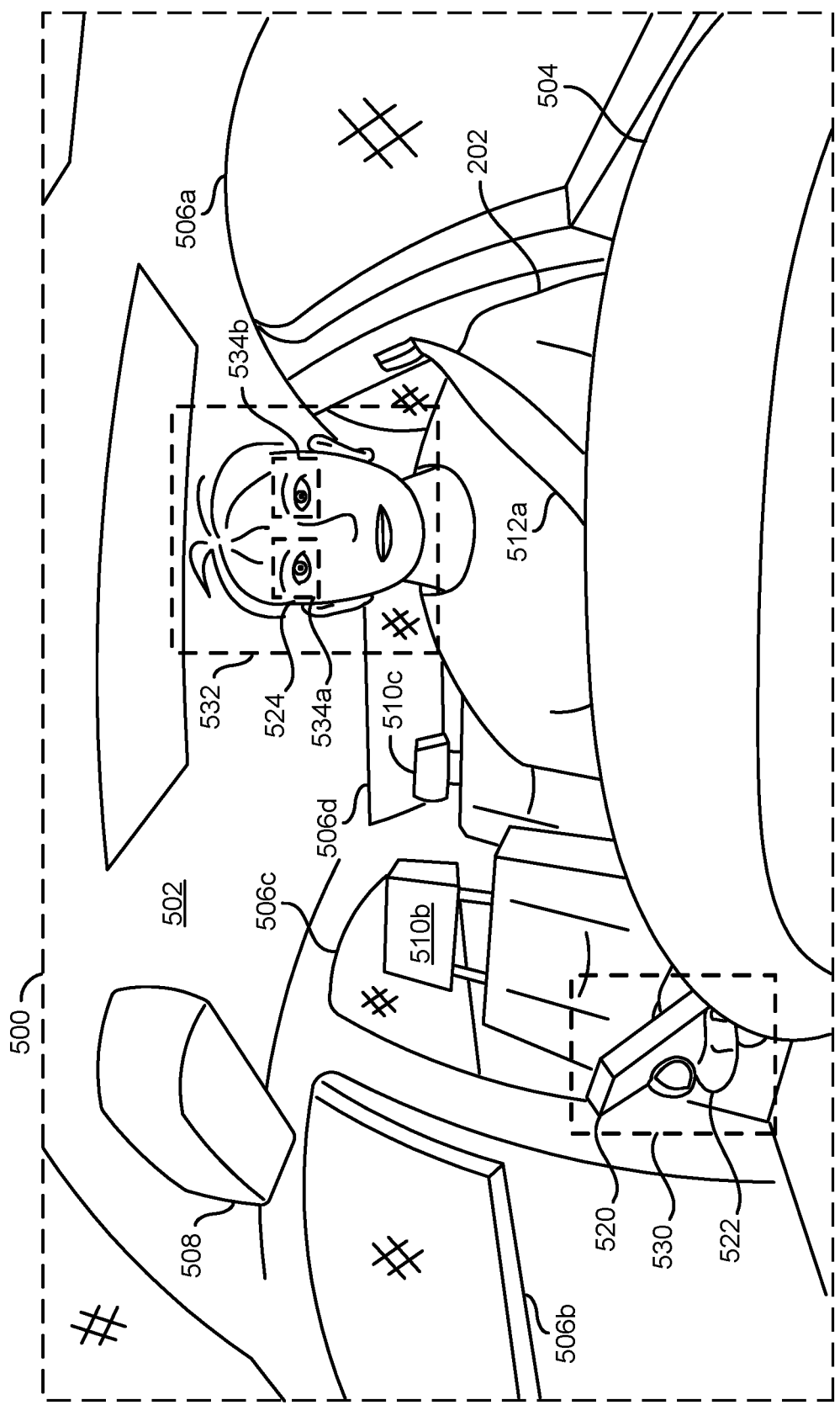
FIG. 7 is a diagram illustrating computer vision operations performed on an example portion of a video frame to detect a face and an unauthorized use of an electronic device by a driver.

Referring to FIG. 7, a diagram illustrating computer vision operations performed on an example portion of a video frame to detect a face and an unauthorized use of an electronic device by a driver is shown. An example video frame portion 500 is shown. The example video frame portion 500 may be a subset of a full video frame captured by one of the capture devices 102a-102n. The processors 106a-106n may be configured to generate video data from the video frames FRAMES_A-FRAMES_N that have a sufficiently high resolution that portions of the video frame may have enough detail for computer vision operations to be performed. In an example, digital zooming, dewarping, oversampling and/or cropping may be performed on a full video frame to generate the video frame portion 500. In another example, the computer vision operations may be performed on a targeted subset (e.g., the video frame portion 500) of the full video frame. For example, if the full video frame is a 4K resolution video frame, the video frame portion 500 may have sufficient detail for the CNN module 150 to detect objects. The method of generating the video frame portion 500 from a full video frame may be varied according to the design criteria of a particular implementation.

The example video frame portion 500 may provide an image of an interior 502 of a vehicle. In the example shown, the video frame portion 500 may be the interior 502 of the vehicle 430c. For example, the video frame portion 500 may be a subset of the full video frame 450 shown in association with FIG. 6. The video frame portion 500 may correspond to the subset of the full video frame 450 shown as the detected windshield 462. For example, the processors 106a-106n may perform the computer vision operations on the full video frame 450 to detect the vehicle 430c. Then the processors 106a-106n may perform targeted computer vision operations on the portion of the video frame 450 that corresponds to the vehicle 430c to detect the license plate 452 and the windshield 454. Then the processors 106a-106n may perform targeted computer vision operations on the video frame portion 500 that corresponds to the detected windshield 462 to detect objects in the interior 502 of the vehicle 430c. The processors 106a-106n may be designed with dedicated hardware modules configured to efficiently generate high resolution video frames in real-time and perform the computer vision operations in real-time.

The vehicle interior 502 shown may comprise a steering wheel 504, doors/windows 506a-506d, a review mirror 508, seats 510b-510c and/or a seatbelt 512a. In the example shown, the door/window 506a may be a driver side door/window, the door/window 506b may be a passenger side door/window, the door/window 506c may be a rear passenger door/window, and the door/window 506d may be the rear window (or the trunk). In the example video frame portion 500, the seat 510b may be the passenger seat and the seat 510c may be the rear passenger seat. In the perspective of the example video frame portion 500, the driver seat (e.g., the seat 510a) may not be visible (e.g., obscured by the driver 202). The rearview mirror 508 may be a reflective mirror and/or an electronic mirror (e.g., one of the displays 118a-118n). In the example shown, the seatbelt 512a may be the driver seat belt. Each of the steering wheel 504, the doors/windows 506a-506d, the rearview mirror 508, the seats 510b-510d and/or the seatbelt 512a may be examples of objects that may be detected by the CNN module 150. The CNN module 150 may be configured to detect and/or recognize other types of objects (e.g., other seatbelts 512b-512n (not shown), the seat 510n (not shown), a vehicle pillar, items stored in the vehicle (e.g., blankets, groceries, ice scrapers, other personal belongings, etc.) within the interior 502.

The driver 202 is shown in the video frame portion 500. An electronic device 520 is shown in the video frame portion 500. A hand 522 of the driver 202 is shown holding the electronic device 520. A head/face 524 of the driver 202 is shown in the video frame portion 500.

In the example shown, the electronic device 520 may be a smart phone. In another example, the electronic device 520 may be a cell phone. In yet another example, the electronic device 520 may be a video game console (e.g., a handheld console). In still another example, the electronic device 520 may be a music player. Generally, the electronic device 520 may be a handheld device that may cause the driver 202 to be distracted. Using the electronic device 520 (e.g., holding the electronic device 520, interacting with the user interface of the electronic device 520, looking at the electronic device 520, etc.) may cause the driver 202 to not pay attention (or not pay full attention) to driving (e.g., the driver 202 may look away from the road). The type of electronic device 520 that the processors 106a-106n may determine unauthorized use of may be varied according to the design criteria of a particular implementation.

A dotted box 530 is shown. The dotted box 530 may represent the computer vision operations performed by the processors 106a-106n to detect the electronic device 520. The CNN module 150 may be configured to detect features and/or descriptors in the example video frame portion 500 and compare the features and/or descriptors against the features and/or descriptors learned from the training data 352a-352n in order to recognize the pixels of the video frame portion 500 that correspond to the electronic device 520. The electronic device detection 530 may also comprise detecting the hand 522 of the driver 202.

A dotted box 532 is shown. The dotted box 532 may represent the computer vision operations performed by the processors 106a-106n to detect the head/face 524 of the driver 202. The CNN module 150 may be configured to detect features and/or descriptors in the example video frame portion 500 and compare the features and/or descriptors against the features and/or descriptors learned from the training data 352a-352n in order to recognize the pixels of the video frame portion 500 that correspond to the head/face 524. In the example shown, only one vehicle occupant (e.g., the driver 202) is shown in the interior 502. However, the processors 106a-106n may be configured to detect heads/faces for each occupant in the interior 502.

Dotted boxes 534a-534b are shown. The dotted boxes 534a-534b may represent the computer vision operations performed by the processors 106a-106n to detect the eyes of the driver 202. The CNN module 150 may be configured to detect features and/or descriptors in the example video frame portion 500 and compare the features and/or descriptors against the features and/or descriptors learned from the training data 352a-352n in order to recognize the pixels of the video frame portion 500 that correspond to the eyes of the driver 202. The eyes 534a-534b may be detected as a sub-portion of the detected face 532 (e.g., the processors 106a-106n may limit the search region for detecting the eyes 534a-534b to the region of the video frame portion 500 that corresponds to the detected face 532).

The processors 106a-106n may be configured to determine whether there is unauthorized use of the electronic device 520. To determine the unauthorized use, the processors 106a-106n may be configured to detect the electronic device 520 and determine whether the driver 202 is interacting with the electronic device 520. The processors 106a-106n may determine how the driver 202 is interacting with the electronic device 520 by performing and making determinations based on the electronic device detection 530, the face detection 532 and/or the eyes 534a-534b. The processors 106a-106n may combine the results from analyzing the electronic device detection 530, the face detection 532 and/or the eyes 534a-534b to make inferences that may not be possible by analyzing the electronic device detection 530, the face detection 532 and/or the eyes 534a-534b alone. For example, merely detecting the electronic device 520 may not provide sufficient evidence of the unauthorized use.

The decision module 158 may weigh multiple factors to make a determination about unauthorized use. The determination may be provided as a confidence level. The confidence level may provide a numerical and/or computer readable representation of how likely the result of the determination is correct. For example, if the decision module 158 determines that there is unauthorized use of the electronic device 520 with a confidence level that is greater than a threshold level, then the processors 106a-106n may generate a response to the unauthorized use. The threshold level may be a pre-defined and/or programmable value. The processors 106a-106n may generate the signal VCTRL as a response. In an example, the response may be to contact the authorities.

The processors 106a-106n may analyze the electronic device detection 530. In the example shown, the processors 106a-106n may detect the electronic device 520. In an example, the presence of the electronic device 520 may increase a confidence level of unauthorized use. In the example shown, the processors 106a-106n may detect the hand 522 with the electronic device 520. The hand 522 may be determined to be holding the electronic device 520. In one example, the hand 522 of the driver 202 holding the electronic device 520 may increase the confidence level of unauthorized use. In another example, if the hand 522 is not the hand of the driver 202 (e.g., the hand 522 may be the body part of another occupant in the interior 502), then the confidence level of the unauthorized use may be decreased (e.g., another occupant using an electronic device may be authorized use). In the example shown, the hand 522 may not be visibly connected to the body of the driver 202 and the processors 106a-106n may determine how likely that the hand 522 is the hand of the driver 202 (e.g., the more likely that the hand 522 belongs to the driver 202, the more the confidence level may be increased).

In some embodiments, the processors 106a-106n may determine whether there is unauthorized use by analyzing the electronic device detection 530 to search for the hand 522. If the hand 522 is not in the subregion of pixels that correspond to the electronic device detection 530 then the processors 106a-106n may decrease the confidence level for unauthorized use. Limiting the search for the hand 522 to the subregion of the electronic device detection 530 may efficiently utilize the resources of the processors 106a-106n (e.g., the location of the hand 524 may be irrelevant for unauthorized use of the electronic device 520 unless the hand 522 is holding the electronic device 520, so searching elsewhere in the video frame portion 500 may not be performed). In some embodiments, the processors 106a-106n may detect both the hand 522 and the electronic device

520 and determine how (or if) the hand 522 is interacting with the electronic device 520.

The processors 106a-106n may analyze the head/face detection 532. In the example shown, the processors 106a-106n may detect the face 524 of the driver 202. The processors 106a-106n may determine a location of the occupants within the interior 502. In one example, the processors 106a-106n may use the location of the face detection 532 to determine the location of the occupants (e.g., each occupant is likely to be located in an area of the interior 502 where the face 524 is located). The location of the occupants may be used to determine which occupant is the driver 202 (e.g., in a scenario that has multiple occupants).

The processors 106a-106n may further analyze the head/face detection 532 to determine the unauthorized use of the electronic device 520. The processors 106a-106n may analyze the direction of the head/face 524. In the example shown, the head/face 524 is shown facing straight ahead (e.g., towards the windshield 454). When the head/face 524 is directed straight ahead, the confidence level for unauthorized use may be decreased. In an example, if the head/face 524 is determined to not be facing the windshield 454 (e.g., the head/face 524 is turned towards the electronic device 520), then the confidence level for unauthorized use may be increased.

The processors 106a-106n may be configured to analyze the eyes 534a-534b to determine the unauthorized use of the electronic device 520. The processors 106a-106n may be configured to determine the direction of the eyes 534a-534b. For example, the driver 202 may attempt to hide the unauthorized use by keeping the head/face 524 straight ahead, but look at the electronic device 520 by moving the eyes 534a-534b to look towards the electronic device 520 (e.g., and look away from the road). In the example shown, the eyes 534a-534b may be directed straight ahead (e.g., towards the windshield 454 and not directed towards the electronic device 520), which may decrease the confidence level of unauthorized use. In another example, if the eyes 534a-534b were directed towards the electronic device 520, then the decision module 158 may increase the confidence level of the unauthorized use.

Each factor analyzed for unauthorized use (e.g., detecting the phone 520, determine whether the hand 522 is holding the phone 520, determining whether the driver 202 is looking at the phone 520 and/or other factors) may be weighted independently and/or together to generate the confidence level of unauthorized use. Each factor may have a different amount of weighting applied to the final confidence level score. The amount that each factor applies to the final confidence level score may be varied according to the design criteria of a particular implementation.

In the example shown, the unauthorized use may be texting while driving, looking at the phone while driving, watching videos while driving and/or using apps while driving. Generally, the unauthorized use may be any type of interaction with the electronic device 520 that takes the focus of the driver 202 away from driving the vehicle. The processors 106a-106n may analyze multiple video frames in a sequence of captured video frames to capture both the electronic device 520 and the driver 202 in the same video frame and/or to capture evidence of unauthorized use shown over multiple video frames (e.g., the electronic device 520 may be shown in one video frame while the driver 202 is looking ahead, and then the electronic device 520 may be hidden from view in a subsequent video frame that shows the driver 202 looking towards where the electronic device 520 is likely to be based on the location of the electronic device 520 shown in previous video frames). In some embodiments, the processors 106a-106n may be configured to determine a direction of a gaze of the eyes 534a-534b. The direction of the gaze and/or the length of time that the gaze is directed at a particular object may be used to distinguish between the driver 202 looking at the electronic device 520 or looking at the radio.

In the example shown, the hand 522 and the detected head 532 may be detected in the same video frame portion 500. In some scenarios, one video frame may not capture both the hand 522 and the detected head 532. The processors 106a-106n may be configured to analyze multiple different video frames that may be captured by more than one of the capture devices 102a-102n. For example, one video frame may capture the hand 522 with the electronic device 520 and another video frame may capture the detected face 532 (e.g., video frames captured from a different perspective). The processors 106a-106n may be configured to analyze both video frames and make inferences based on the computer vision operations performed on both the video frames. Feature markers of the detected head 532 extracted from multiple video frames may be compared to determine whether the detected head 532 corresponds to the same person. Inferences may be made about the same person based on the video frames captured from multiple perspectives.

Figure 8:
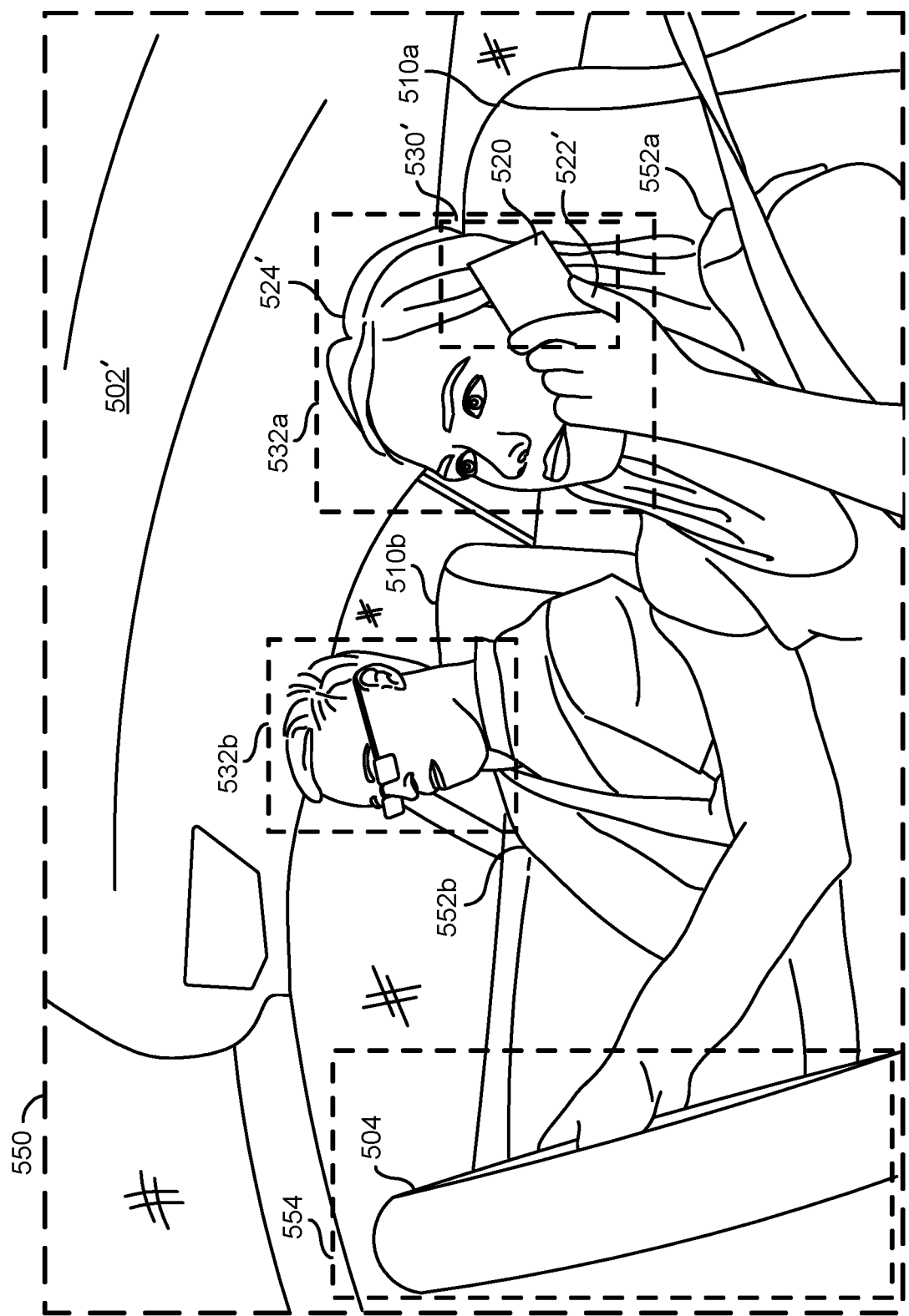
FIG. 8 is a diagram illustrating computer vision operations performed on another example video frame to detect a face and an unauthorized use of an electronic device by a driver.

Referring to FIG. 8, a diagram illustrating an example video frame used to detect mobile phone usage is shown. An example video frame portion 550 is shown. The example video frame portion 550 may be a subset of a full video frame captured by one of the capture devices 102a-102n. The processors 106a-106n may be configured to generate video data from the video frames FRAMES_A-FRAMES_N that have a sufficiently high resolution that portions of the video frame may have enough detail for computer vision operations to be performed.

In an example, digital zooming, dewarping, oversampling and/or cropping may be performed on a full video frame to generate the video frame portion 550. In another example, the computer vision operations may be performed on a targeted subset (e.g., the video frame portion 550) of the full video frame. For example, if the full video frame is a 1080P resolution video frame, the video frame portion 550 may have sufficient detail for the CNN module 150 to detect objects. Limiting the analysis to the video frame portion 550 instead of the full video frame may reduce the number of calculations by eliminating unnecessary calculations. By eliminating unnecessary calculations, the processors 106a-106n may operate consuming less than 3 W of power. The method of generating the video frame portion 550 from a full video frame may be varied according to the design criteria of a particular implementation.

The example video frame portion 550 may be a portion of a full video frame that corresponds to the interior 502' of a vehicle (e.g., the vehicle 430c) captured by one of the capture devices 102a-102n. In an example, the full video frame may be captured by the capture devices 102a-102n implemented in the ego vehicle 50. The ego vehicle 50 may be driving alongside (or in the next lane traveling in the opposite direction) the vehicle 430c, and capture a full video frame that comprises the video frame portion 550 of the interior 502'. In another example, the video frame portion may be captured by the capture devices 102a-102n mounted to one of the fixed locations 420a-420n. The example video frame portion 550 may be a portion of a video frame capturing a front row of seats of the interior 502' of the vehicle 430c through a driver side window of the vehicle 430c.

The seats 510a-510b are shown in the video frame portion 550. The seat 510a may be in the driver seat. The seat 510b may be in the passenger seat. The steering wheel 504 is shown. The steering wheel 504 may correspond with the driver seat 510a.

Occupants 552a-552b are shown in the interior 502' of the vehicle. The occupant 552a is shown in the driver seat 510a. The occupant 552b is shown in the passenger seat 510b. In an example, the decision module 158 may determine which of the occupants 552a-552b is the driver 202 based on the location of the steering wheel 504 (e.g., for regions where the driver side of a vehicle is the right side).

The electronic device 520 is shown as a smartphone. The driver 552a is shown holding the smartphone 520. The smartphone 520 is shown held up to the ear of the driver 552a. In the example shown, the use of the smartphone 520 may be an unauthorized use. For example, use of the smartphone 520 while driving may be illegal and/or result in the driver 552a receiving a fine if caught by a traffic enforcement official.

The decision module 158 may be configured to determine whether the use of the electronic device 520 is an unauthorized use. In an example, if the electronic device 520 is a cellular phone, the unauthorized use may be talking on the cellular phone 520 while driving (e.g., unauthorized use of the electronic device 408 may be interactions with the electronic device 520 that distract the driver 552a from driving). The decision module 158 may analyze the results of the computer vision operations performed by the processors 106a-106n to determine whether there is unauthorized use of the electronic device 520.

Detected heads/faces 532a-532b located by the processors 106a-106n are shown. The face detection 532a may correspond to the face of the driver 552a. The face detection 532b may correspond to the face of the passenger 552b. The processors 106a-106n may further detect the seats 510a-510b. The processors 106a-106n may be configured to determine that the face detection 532a corresponds to the occupant 552a located in the driver seat 510a. The processors 106a-106n may be configured to determine that the face detection 532b corresponds to the occupant 552b located in the passenger seat 510b. The processors 106a-106n may be further configured to detect other passengers within the vehicle interior 502'. In the example shown, only the two occupants 552a-552b may be in the vehicle interior 502'. However, the number and/or locations of the occupants of the vehicle interior 502' capable of being detected, classified and/or analyzed by the processors 106a-106n may be varied according to the design criteria of a particular implementation.

The CNN module 150 may be configured to classify current characteristics of the components of the vehicle interior 502'. In one example, the CNN module 150 may determine the current location of the seats 510a-510b and/or the current angle of recline of the seats 510a-510b. The current location and/or current recline of the seats 510a-510b may be an example of current characteristics of the components of the vehicle interior 502'. The driver 552a is shown holding the steering wheel 504. The CNN module 150 may be configured to detect and/or classify an object detection 554 as the steering wheel 504. The CNN module 150 may be further configured to detect a location and/or angle of the steering wheel 504 (e.g., a current configuration and/or orientation of a component of the vehicle interior 502').

The processors 106a-106n may be configured to determine the characteristics of the occupants 552a-552b for a particular one of the seats 510a-510b. In an example, the characteristics of the occupants 552a-552b may comprise an orientation of body parts. In the example shown, the characteristics of the driver 552a may comprise a location and/or orientation of the right arm (e.g., holding the steering wheel 504) and the left arm (e.g., held up to the ear). In another example, the characteristics of the driver 552a may comprise a direction and/or rotation of the head 524'. In the example shown, the driver 552a is shown looking forward (e.g., at the road). If the driver 552a is not looking at the road, the decision module 158 may determine that the driver 552a is potentially distracted (e.g., the driver 552a may be looking down to text on an electronic device 520). The types of characteristics analyzed may be varied according to the design criteria of a particular implementation.

The electronic device detection 530' is shown. The processors 106a-106n may be configured to detect a location of the smartphone 520 within the video frame portion 550. In an example, the processors 106a-106n may determine coordinates (e.g., horizontal, vertical and depth) of the location of the smartphone 520 with respect to the video frame portion 550. The determined coordinates of the location of the smartphone 520 may be cross-referenced with the determined location of the face detection 532a. In the example shown, the location of the electronic device detection 530' is shown next to (or near or close to) the ear of the driver 520. For example, the decision module 158 may determine that the coordinates of the smartphone 520 match and/or fall within a range of coordinates of the video frame portion 550 that correspond with the location of the head detection 532a of the driver 552a. In the example shown, the smartphone 520 is within the face detection 532a shown around the head 524' of the driver 552a.

The decision module 158 may be configured to determine whether the driver 552a is using the smartphone 520 while driving. In one example, detecting the smartphone 520 close to the ear and/or head 524' of the driver 552a may be sufficient evidence to determine that the driver 552a is using the smartphone 520 while driving (e.g., an unauthorized and/or illegal use). The decision module 158 may analyze the results of the computer vision operations to determine an amount of time that the hand and/or the smartphone 520 has been located close to the ear. For example, the decision module 158 may determine that the unauthorized use of the smartphone 520 may occur when the hand 522' and/or the smartphone 520 has been located close to the ear for a pre-determined amount of time TS (e.g., 10 seconds, 20 seconds, a minute, etc.). When the decision module 158 determines that there is an unauthorized use of the smartphone 520, the processors 106a-106n may perform a response. The response by the processors 106a-106n may be to generate the signal VCTRL. The signal VCTRL may be a notification signal. The signal VCTRL may be transmitted to one or more of the actuators 116 and/or the communication devices 110 to perform the response selected by the decision module 158.

In some embodiments, based on an identification determined based on reading the license plate 452 and/or using facial recognition on the detected face 532a to determine an identity of the driver 552a, the processors 106a-106n may be configured to contact the driver 552a directly. In an example, a phone number may be on record and the communication devices 510 may be configured to contact the smartphone 520 to send a message to stop using the smartphone 520 while driving or the authorities may be contacted. The notification signal VCTRL may be generated to enable a response that warns the driver 552a about the unauthorized usage. In one example, the response may be to perform an audible noise to alert the driver 552a. In another example, the audio may be a pre-recorded message (e.g., a voice speaking a message such as, "It is against the law to use a mobile phone while driving. Please put the phone down and pay attention to the road, or you may receive a fine."). The number and/or type of notifications and/or responses performed may be varied according to the design criteria of a particular implementation.

In some embodiments, the decision module 158 may select graduating (or tiered) responses. For example, when the apparatus 100 is able to capture the driver 552a in multiple locations and/or at multiple different times, the processors 106a-106n may determine whether the behavior of the driver 552a with respect to the electronic device 520 has changed. In an example, if the apparatus 100 is implemented in the ego vehicle 50, and the ego vehicle 50 is following the vehicle 430c, the processors 106a-106n may determine whether the driver 552a has stopped using the electronic device 520 after an unauthorized use had been detected. In another example, if the apparatus 100 is implemented attached to various fixed structures 420a-420n, the processors 106a-106n may analyze the driver 552a at multiple locations (e.g., the driver 552a may have been using the electronic device 520 at the intersection 402, but stopped using the electronic device 520 at a next intersection). For example, the processors 106a-106n may not contact the authorities if only one unauthorized use is detected. If there are repeated detections of unauthorized use (e.g., the same license plate 452 and/or the same driver 552a determined based on facial recognition), then the authorities may be contacted. In an example, on a first detection of unauthorized use, the apparatus 100 may send a warning (e.g., a notification to stop using the smartphone 520) and then if further usage is detected contact the authorities may be contacted. The number of response tiers and/or types of responses in each tier of responses may be varied according to the design criteria of a particular implementation.

The decision module 158 may be configured to compare a detected scenario to local rules. In one example, the local rules may be stored by the memory 108. The local rules may indicate when and how the use of the electronic device 520 is unauthorized. If the apparatus 100 is movable (e.g., implemented in the ego vehicle 50), then the local rules may be determined based on a GPS/GNSS reading (e.g., performed by the sensors 114) to determine a current location. For example, a current location may be compared to a region that the local rules are applied to. The processors 106a-106n may update the descriptors and/or features to search for in the video frame portion 550 based on the local rules for the location. If the apparatus 100 is stationary (e.g., mounted to the fixed structures 420a-420n), then the local rules may be stored in the memory 108.

The decision module 158 may be further configured to take into account the usage scenario of the target vehicle. Taking into account usage scenarios may prevent false positives. For example, the processors 106a-106n may analyze the interior 502' as well as the entirety of the vehicle 430c and/or the environment near the vehicle 430c. In one example, use of the smartphone 520 may be authorized when the vehicle 430c is pulled over to the side of the road and parked. The computer vision operations performed by the processors 106a-106n may be configured to determine whether the vehicle 430c is not moving, whether the hazard lights are flashing, etc. If the decision module 158 determines that the vehicle 430c is parked, and the local rules allow for the smartphone 520 to be used while the vehicle is parked, then the decision module 158 may not perform the response when the smartphone 520 is detected near the ear of the driver 552a. In another example, if the processors 106a-106n determine that the driver 552a is stopped at a stoplight instead of parked on the side of the road, then the decision module 158 may perform the response (e.g., the processors 106a-106n may detect no speed, but the brake lights may be active and no hazard lights are on). In another example, if the local rules indicate that there are no laws against usage of the smartphone 520 while driving, then the decision module 158 may not perform the response.

In some embodiments, the processors 106a-106n may detect and/or analyze the passenger 552b. In an example, if the passenger 552b is using the smartphone 520 instead of the driver 552a, then no response may be performed (e.g., mobile phone usage by the passenger 552b may be authorized). The decision module 158 may distinguish between smartphone usage by the driver 552a and the passenger 552b and/or other passengers (e.g., to prevent false positives). The processors 106a-106n may be configured to perform the steering wheel detection 554 to detect which of the seats 510a-510b that the steering wheel 504 is located in front of (e.g., left side or right side) in order to define which person is the driver 202 and which is the passenger (who may legally use the electronic device 520).

In the example shown, the processors 106a-106n may be configured to detect that the smartphone 520 is held in the hand 522' of the driver 552a. In response to detecting the smartphone 520 in the hand 522' of the driver 552a, the decision module 158 may increase the confidence level of unauthorized use of the electronic device 520. In the example shown, the processors 106a-106n may be configured to detect that the smartphone 520 is being held up to the side of the head 524' (e.g., held up to the ear). In response to detecting the smartphone 520 being held up to the ear (e.g., talking on the smartphone 520), the decision module 158 may increase the confidence level of unauthorized use of the electronic device 520. The processors 106a-106n may further determine how long the smartphone 520 has been held up to the ear by analyzing a sequence of the video frames captured by the capture devices 102a-102n. For example, holding the smartphone 520 up to the ear for a long time (e.g., longer than the threshold time TS) may further increase the confidence level for unauthorized use of the electronic device 520. In response to determining that the confidence level for unauthorized use is above a threshold level, the processors 106a-106n may contact the authorities. For example, the notification sent to the authorities may comprise an image of the license plate 452 and an image of the driver 552a holding the electronic device 520 up to the ear. The authorities may decide whether to issue a ticket/fine.

The CNN module 150 may be configured to implement the dedicated hardware modules configured to perform the feature detection to calculate the descriptors. In the example shown, the descriptors may be used by the processors 106a-106n for determining a likelihood that the pixels of the video frame portion 550 belong to the objects (e.g., the detected face 532a and the detected smartphone 530') that correspond to the use of the electronic device 520 by the driver 552a.

Figure 9:
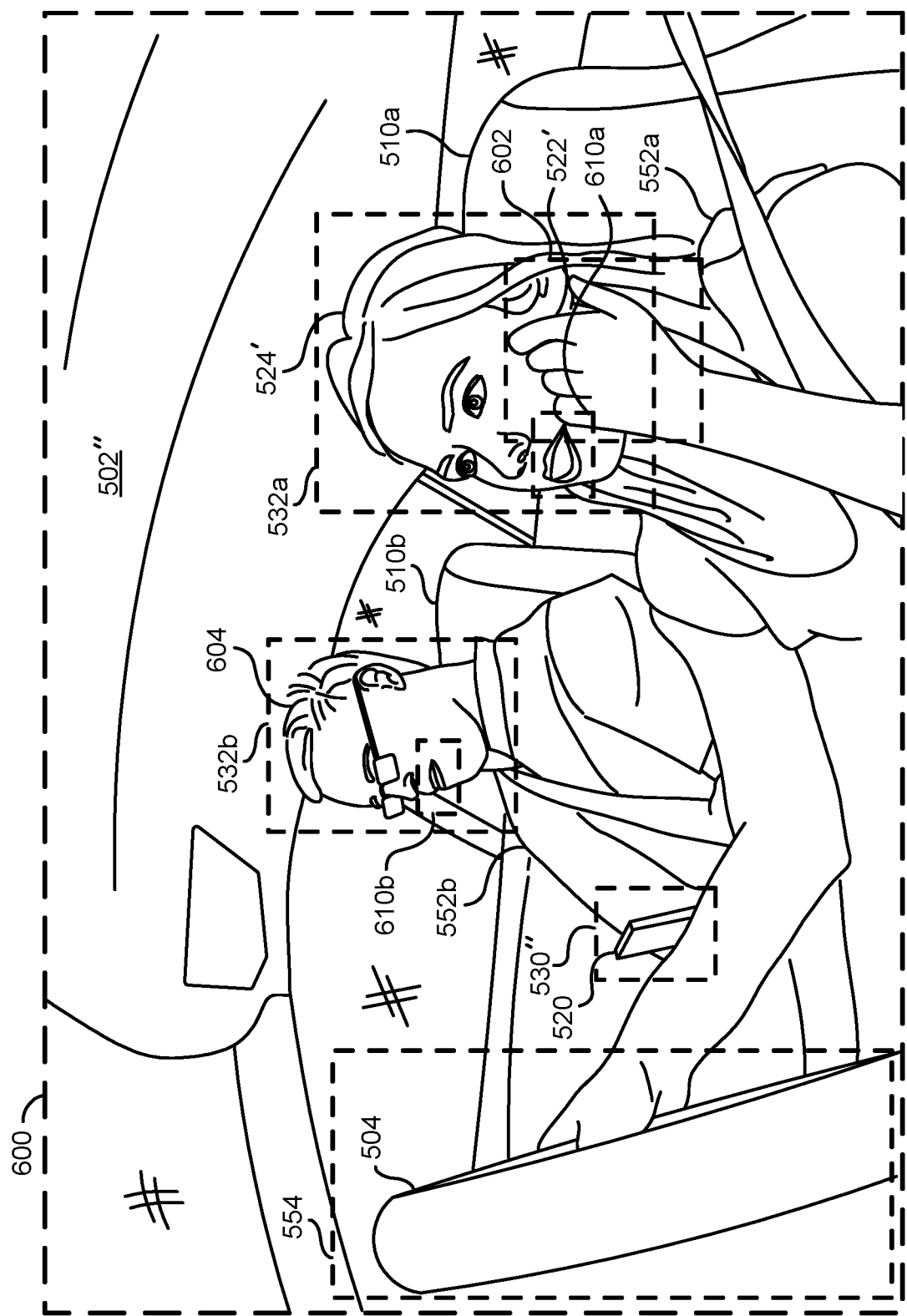
FIG. 9 is a diagram illustrating computer vision operations performed on an example video frame to detect a face and distinguish between an unauthorized use and an authorized use of an electronic device.

Referring to FIG. 9, a diagram illustrating an example video frame portion 600 used to detect characteristics of mobile phone usage is shown. Similar to the example video frame portion 550 shown in association with FIG. 8, the example video frame portion 600 may comprise the steering wheel 504, the seats 510a-510b, the electronic device 520, the hand 522', the head/face detections 532a-532b, the occupants 552a-552b and/or the steering wheel detection 554. In the example video frame portion 600, the smartphone 520 may be hidden from view (e.g., obscured by the hand 522') or may not be used by the driver 552a. The processors 106a-106n may be configured to determine whether the driver 552a is attempting to conceal usage of a smartphone. The processors 106a-106n may be configured to determine whether the driver 552a is not using the electronic device 520.

A dotted box 602 is shown. The dotted box 602 may represent a detection of the hand 522' of the driver 552a by the CNN module 150. The CNN module 150 may be configured to determine the orientation and/or characteristics of the detected hand 602 (e.g., location, gripping an object, not gripping an object, open, closed, bent, held upright, etc.). In the example shown, the orientation and/or characteristics of the detected hand 602 may be that the hand 522' is held up to the head 524', located near the ear of the driver 552a, the hand 522' appears to be gripping an object, the object is not visible, and the hand 522' is upright.

Based on the orientation and/or characteristics of the hand detection 602, the decision module 158 may determine whether the driver 552a is holding the smartphone 520 (e.g., detect the smartphone 520 in the hand 522' of the driver 552a). In some scenarios, the decision module 158 may be unable to make a conclusive decision based on the hand detection 602. In the example shown, the hand 522' may be holding the smartphone 520 (e.g., which may be an unauthorized usage), may be holding another item (e.g., which may or may not be an unauthorized usage) or the driver 552a may be resting her head 524' on her hand 522' (e.g., not unauthorized). For the example shown, the decision module 158 may be unable to achieve a high enough confidence level to determine whether the driver 552a is using the smartphone 520. In some embodiments, the sensor fusion module 152 may be configured to aggregate other sources of data to enable the decision module 158 to make a decision (e.g., detect audio to determine if the driver 552a is talking aloud).

The head/face 524' of the driver 552a and a head/face 604 of the passengers 552b are shown. The detected face 532a may correspond to the head 524' of the driver 552a. The detected face 532b may correspond to the head 604 of the passenger 552b.

Dotted boxes 610a-610b are shown. The dotted boxes 610a-610b may represent a detection by the CNN module 150 of the mouths of the occupants 552a-552b. The dotted box 610a may correspond to the mouth of the driver 552a. The dotted box 610b may correspond to the mouth of the passenger 552b. In the example shown, the detected mouth 610a may be opened. In the example shown, the detected mouth 610b may be closed. The processors 106a-106n may search the video frame portion 600 for the head detections 532a-532b and then search a subset of the video frame portion 600 that corresponds to the head detections 532a-532b for the mouth detections 610a-610b. Since the mouth detections 610a-610b may only occur where there is one of the head detections 532a-532b, the processors 106a-106n may efficiently utilize hardware resources by ignoring portions of the video frame portion 600 that do not correspond to the head detections 532a-532b. By ignoring portions of the video frame portion 600 that comprises irrelevant information for the types of objects being searched for may eliminate computations (e.g., unnecessary computations) which may reduce heat generated and/or power consumption of the processors 106a-106n.

The characteristics of the mouth detections 610a-610b may be detected by the CNN module 150. The characteristics of the mouth detections 610a-610b may be used to determine whether the driver 552a is using the smartphone 520. In one example, the detected open mouth 610a of the driver 552a may be an indicator that the driver 552a is talking (e.g., which may increase a confidence level of detecting that the smartphone 520 is being used).

The processors 106a-106n may analyze video frames captured over an amount of time. For example, in the example video frame portion 600, the detected mouth 610a may be open, but in a next frame the detected mouth 610a may be closed. In an example, a single frame (or video frame portion) may not provide sufficient information about the mouth or other characteristics (e.g., the driver 552a may not be using the electronic device 520 but the detected mouth 610a may be opened because the driver 552a is yawning, talking, chewing food, etc.).

A series (or sequence) of video frames may be analyzed by the processors 106a-106n to determine the lip and/or mouth movement. For example, detecting that the lips and/or mouth 610a regularly changing between opened and closed may indicate that the driver 552a is talking. In another example, the CNN module 150 may be configured to monitor for particular mouth shapes (e.g., based on the mouth movements used for making particular sounds and/or phonetics of a language). In one example, the memory 108 may store reference mouth shapes that correspond to the phonetics of a language of the current region (e.g., English in the US, English and French in Canada, Italian in Italy, etc.). If the detected mouth 610a is determined to be making mouth movements that correspond to speech, the decision module 158 may determine that the driver 552a is speaking. If the driver 552a is determined to be speaking, a confidence level that the driver 552a is using the smartphone 520 may be increased.

The processors 106a-106n may be configured to detect other conversation indicators. In one example, the computer vision operations performed by the processors 106a-106n may analyze the detected head 532a to detect nodding by the driver 552a as a conversation indicator (e.g., many people nod while talking on the phone). In another example, the computer vision operations performed by the processors 106a-106n may analyze the head detection 532a and/or the hand detection 602 to detect shaking a head and/or hand gestures. The presence of conversation indicators may increase the confidence level that the smartphone 520 is being used by the driver 552a. The types of conversation indicators detected may be varied according to the design criteria of a particular implementation.

The electronic device 520 is shown as a smartphone held by the passenger 552b. In the example shown, the processors 106a-106n may analyze the electronic device detection 530" to determine that the electronic device 520 is being used by the passenger 552b and not by the driver 552a. The processors 106a-106n may be configured to correlate the location of the electronic device detection 530" with the location of the passenger 552b. Since the smartphone 520 is being used by the passenger 552b and not being used by the driver 552a, the processors 106a-106n may not generate the notification signal VCTRL. Similarly, the processors 106a-106n may not generate the notification signal VCTRL in response to any other occupants in the interior 502", other than the driver 552a, that are using an electronic device 520 (e.g., usage of the electronic device 520 by the passenger 552b may not be unauthorized).

Generally, the characteristics of the passenger 552b and/or other occupants may be irrelevant to determining whether the driver 552a is using the smartphone 520. However, in some scenarios, the characteristics of the passenger 552b may be informative to determining whether the driver 552a is using the smartphone 520. In an example, the detected mouth 610b may be analyzed along with the detected mouth 610a to determine whether the driver 552a and the passenger 552b are speaking to each other. If the driver 552a is speaking with the passenger 552b, then the confidence level for usage of the smartphone 520 by the driver 552a may be decreased.

For example, if the characteristics of the detected mouth 610a are determined to be consistent with speaking and the characteristics of the detected mouth 610b are determined to be consistent with not speaking, then the confidence level for usage of the smartphone 520 by the driver 552a may be increased (e.g., only the driver 552a speaking may indicate that the driver 552a is talking on the phone 520). In another example, if the characteristics of the detected mouth 610a are determined to be consistent with speaking and the characteristics of the detected mouth 610b are determined to be consistent with speaking, then the confidence level for usage of the smartphone 520 by the driver 552a may be decreased (e.g., the driver 552a and the passenger 552b may be speaking to each other). In an example, the processors 106a-106n may analyze the movement of the detected mouths 610a-610b and determine that the detected mouth 610a may start moving while the detected mouth 610b is not moving, then the detected mouth 610b may start moving while the detected mouth 610a stops moving. The back and forth mouth movement detected over a sequence of video frames may be indicative of a conversation (e.g., one person talks while one person listens, then the person stops talking while the other person responds). If a conversation between the two occupants 552a-552b is detected, then the likelihood that the driver 552a is speaking into the smartphone 520 (e.g., the unauthorized use) may be reduced.

The sensor fusion module 152 may be configured to make inferences in response to multiple disparate sets of information. The decision module 158 may make a decision in response to the inferences from the sensor fusion module 152. The decision module 158 may analyze the multiple factors in the example video frame portion 600 (or sequence of video frames) to determine whether there is unauthorized usage of the smartphone 520. In the example shown, the lack of presence of the smartphone 520 may decrease a confidence level of determining an unauthorized use, the orientation and/or characteristics of the hand detection 602 may increase a confidence level of determining an unauthorized use, the characteristics of the detected mouths 610a-610b may increase the confidence level of determining an unauthorized use, etc. The number and/or types of factors taken into account by the decision module 158 may be varied according to the design criteria of a particular implementation.

The CNN module 150 may be configured to implement the dedicated hardware module configured to perform the feature detection to calculate the descriptors. In the example shown, the descriptors may be used by the processors 106a-106n for determining a likelihood that the pixels of the video frame portion 600 belong to the objects and/or characteristics of the objects (e.g., the face detections 532a-532b, the mouth detections 610a-610b and the hand detection 602) that correspond to the use of the electronic device 520 by the driver 552a.

Figure 10:
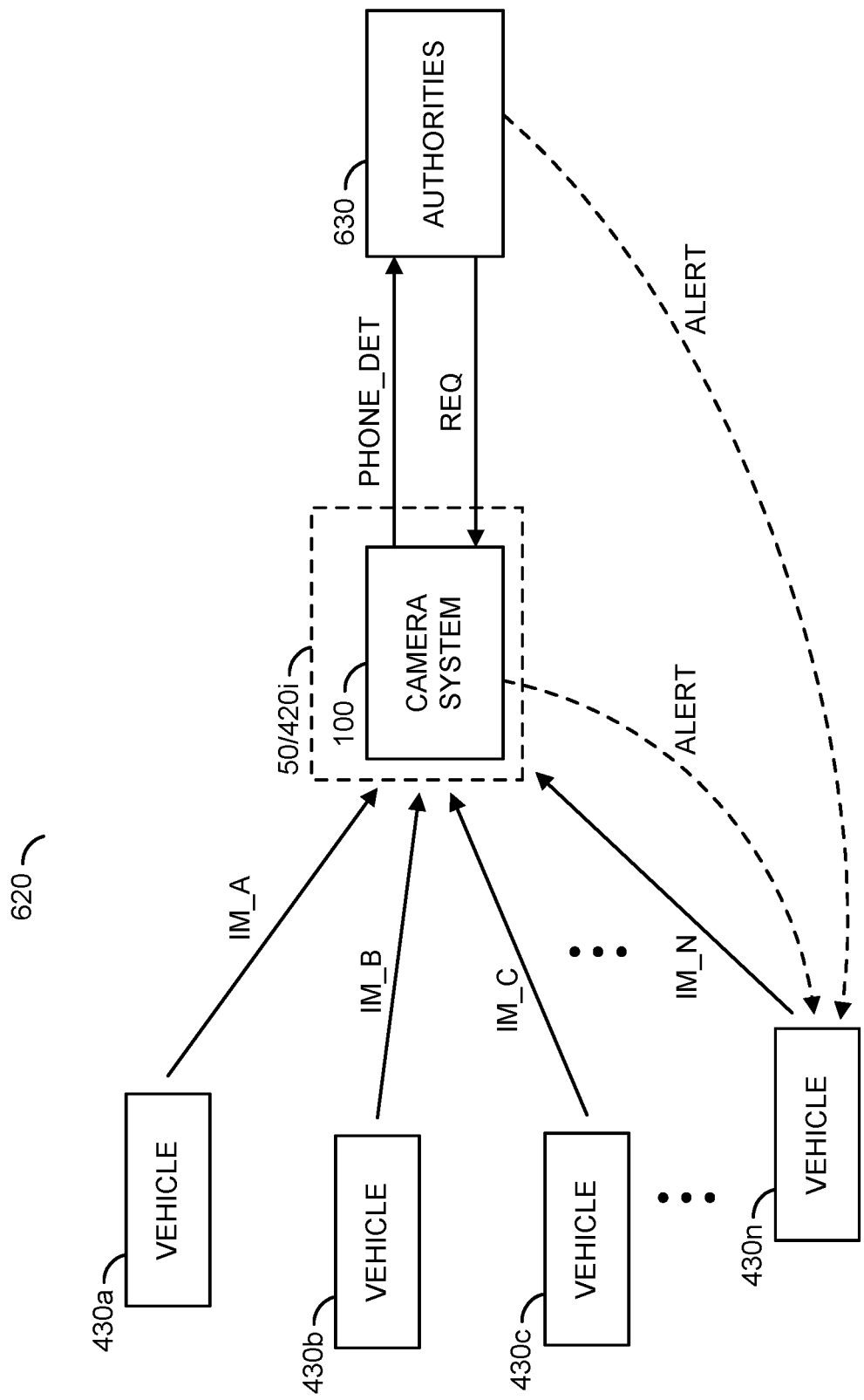
FIG. 10 is a block diagram illustrating an example of monitoring vehicles for unauthorized use of an electronic device and generating a report to authorities.

Referring to FIG. 10, a block diagram illustrating an example of monitoring vehicles for unauthorized use of an electronic device and generating a report to authorities is shown. A system 620 is shown. The system 620 may comprise the camera system 100, multiple vehicles 430a-430n and/or authorities 630. In the example system 620, one camera system 100 is shown. The camera system 100 may be implemented as part of the ego vehicle 50 (e.g., in a movable implementation) and/or mounted at one of the fixed structures 420a-420n (e.g., the fixed structure 420i, in the example shown). In some embodiments, multiple instances of the camera system 100 (e.g., the camera systems 100a-100n) may be implemented. For example, one of the camera systems 100a-100n may be installed at each roadway intersection. The number of camera systems 100a-100n implemented and/or the number of vehicles 430a-430n monitored by each camera system 100 may be varied according to the design criteria of a particular implementation.

The signals IM_A-IM_N are shown being captured by the camera system 100. The lenses 112a-112n may be used to capture the vehicles 430a-430n and the capture devices 102a-102n may generate video frames FRAMES_A-FRAMES_N of the vehicles 430a-430n. The processors 106a-106n may be configured to perform the computer vision operations on the video frames FRAMES_A-FRAMES_N. The computer vision operations may be performed by the processors 106a-106n to detect unauthorized use of the electronic device 520. If the processors 106a-106n detect the unauthorized use of the electronic device 520, the processors 106a-106n may generate the signal VCTRL. In some embodiments, the signal VCTRL may be used to enable the communication devices 110 to transfer data. In an example, the data transferred by the communication devices 110 may be a notification.

The camera system 100 is shown generating a signal (e.g., PHONE_DET). The signal PHONE_DET may be communicated by the communications devices 110 to the authorities 630. The signal PHONE_DET may comprise evidence of the unauthorized use of the electronic device 520 by the driver of one or more of the vehicles 430a-430n. The signal PHONE_DET may comprise an image generated from the video data analyzed by the processors 106a-106n.

The signal PHONE_DET may comprise data (e.g., the license plate 452 and the vehicle interior 502) that may enable correlating the driver 202 using the electronic device 520 in the vehicle 430c with the license plate 452. In one example, the signal PHONE_DET may comprise an image of the license plate 452 and the vehicle interior 502 of one of the vehicles 430a-430n that correspond to the unauthorized use of the electronic device 520. In another example, the signal PHONE_DET may comprise separate images, one image of the license plate 452 and another image of the vehicle interior 502 of one of the vehicles 430a-430n that correspond to the unauthorized use of the electronic device 520. In yet another example, the signal PHONE_DET may comprise a sequence of images of the license plate 452 and the multiple images of vehicle interior 502 of one of the vehicles 430a-430n that correspond to the unauthorized use of the electronic device 520 (e.g., to show continued usage of the electronic device 520 over time). In still another example, the signal PHONE_DET may comprise an image of the license plate 452 and the vehicle interior 502 of one of the vehicles 430a-430n that correspond to the unauthorized use of the electronic device 520 along with the OCR result of the license plate 452 determined by the processors 106a-106n. For example, the signal PHONE_DET may comprise images similar to the full video frame 450 shown in association with FIG. 6, the video frame portion 500 shown in association with FIG. 7, the video frame portion 550 shown in association with FIG. 8 and/or the video frame portion 600 shown in association with FIG. 9. The type of evidence provided by the camera system 100 to the authorities 630 may be varied according to the design criteria of a particular implementation.

The camera system 100 is shown receiving a signal (e.g., REQ). The signal REQ may be received by the communications devices 110 from the authorities 630. The signal REQ may comprise feedback from the authorities 630. In some embodiments, the signal REQ may comprise a request for additional information. In an example, the authorities may request additional information such as different angles, a better view, images that show continued use of the electronic device 520, etc. In some embodiments, the signal REQ may comprise feedback. In an example, the feedback may be used as training data for future determinations of the unauthorized use of the electronic device 520.

The authorities 630 may decide whether to issue a ticket/fine to the driver of the vehicle(s) 430a-430n based on the proof provided in the signal PHONE_DET. In an example, a person may manually review the evidence provided to the authorities 630. The manual review may ensure that the results of the decision made by the processors 106a-106n is correct (e.g., to prevent false positives that result in fines being issued by mistake). The manual review may be performed by the authorities 630 to double check that the license plate 452 has been correctly identified (e.g., no mistaken character values, that the character values are clearly visible, etc.). The manual review may double check that the detected driver is shown performing the unauthorized use of the electronic device 520. The manual review may also enable human judgment (e.g., even if the driver is clearly shown using the electronic device 520 while driving, the person may decide not to issue a ticket, issue a warning instead, request additional information, etc.). In an example, the authorities 630 may comprise a police service and/or security service. The notification signal PHONE_DET may be used by the authorities 630 as evidence to provide a ticket if the authorities 630 confirm (e.g., a manual inspection) that the use of the electronic device 520 is unauthorized. The ticket may be issued to a person based on the license plate 452 (e.g., the owner of the vehicle).

If the manual reviewer wants additional information, the authorities may present the signal REQ to the camera system 100. The manual reviewer may provide feedback to the camera system 100 using the signal REQ. If the manual reviewer decides that the determination by the processors 106a-106n is correct (e.g., about the license plate number, about the unauthorized use of the electronic device 520 by the driver, other factors such as the color/make/model of the detected vehicle, etc.), then the authorities may provide positive feedback to the camera system 100. If the manual reviewer decides that the determination by the processors 106a-106n is not correct, then the authorities may provide negative feedback to the camera system 100. The processors 106a-106n may take into account the positive and/or negative feedback to make adjustments to the decision making performed (e.g., to continually improve results of object detection and/or classification).

A signal (e.g., ALERT) is shown. The signal ALERT may be generated by the camera system 100 and/or the authorities 630. In the example shown, the signal ALERT may be provided to the vehicle 430n. However, the signal ALERT may be presented to any one of the vehicles 430a-430n.

The signal ALERT may be provided to notify the driver of the vehicles 430a-430n about the unauthorized use of the electronic device 520. In an example, based on the number of the license plate 452 and/or facial recognition performed on the driver, the camera system 100 and/or the authorities 630 may determine an identity of the driver that has been detected performing the unauthorized use of the electronic device 520. The signal ALERT may be sent to warn the driver that the unauthorized use has been detected. For example, the signal ALERT may be presented before issuing a fine/ticket (e.g., to first provide a warning). In some embodiments, the signal ALERT may be sent to the other vehicles 430a-430n that are determined to be nearby the driver that has been detected performing the unauthorized use. Providing the signal ALERT to the other drivers may enable the other drivers to take precautions by having knowledge of an inattentive driver nearby that is using the electronic device 520.

Figure 11:
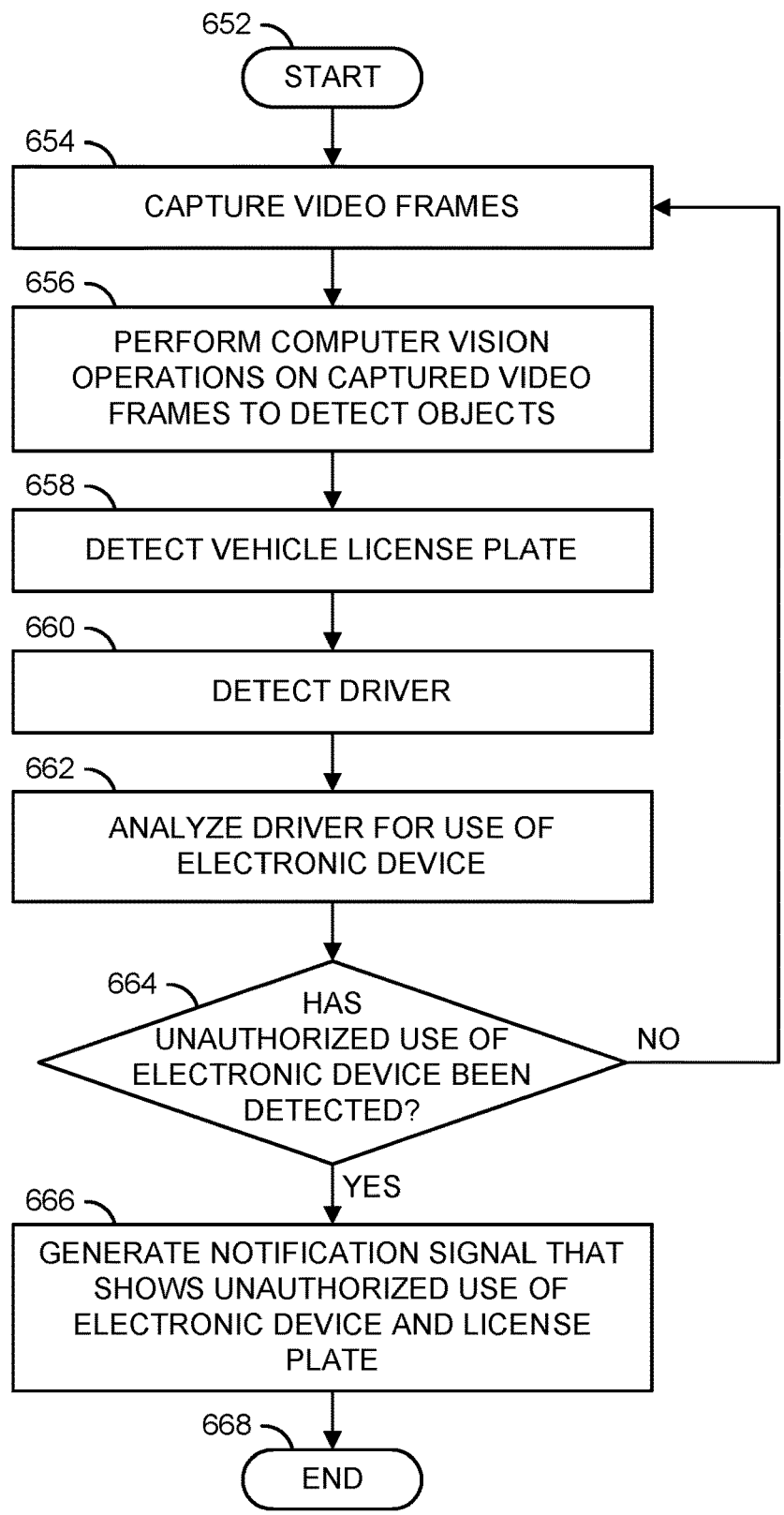
FIG. 11 is a flow diagram illustrating a method for implementing a surveillance camera to detect usage of an electronic device in passing vehicles.

Referring to FIG. 11, a method (or process) 650 is shown. The method 650 may implement a surveillance camera to detect usage of an electronic device in passing vehicles. The method 650 generally comprises a step (or state) 652, a step (or state) 654, a step (or state) 656, a step (or state) 658, a step (or state) 660, a step (or state) 662, a decision step (or state) 664, a step (or state) 666, and a step (or state) 668. The steps 652-668 may not represent a precise sequence of operations. The method 650 may comprise additional steps and/or intermediate steps. Each of the steps 652-668 may comprise more than one operation. The steps 652-668 may be performed in sequence, in parallel and/or partially in parallel. Not all of the steps 652-668 may be performed. The steps 652-668 may be examples of operations. Other operations may be performed.

The step 652 may start the method 650. In the step 654, the capture devices 102a-102n may capture video frames. The video frames FRAMES_A-FRAMES_N captured may be presented by the capture devices 102a-102n to the processors 106a-106n. Next, in the step 656, the CNN module 150 may perform computer vision operations on the captured video frames FRAMES_A-FRAMES_N to detect objects. In the step 658, the CNN module 150 may detect the license plate 452. In the step 660, the CNN module 150 may detect the driver 202. Next, in the step 662, the CNN module 150 may analyze the driver 202 for use of the electronic device 520. Next, the method 650 may move to the decision step 664.

In the decision step 664, the decision module 158 may determine whether unauthorized use of the electronic device 520 has been detected. In an example, the processors 106a-106n may analyze the detected electronic device 530, the detected head/face 532 and/or the detected hand 602 to determine whether the driver 202 is texting and/or speaking on a smartphone. If no unauthorized use has been detected, then the method 650 may return to the step 654. If unauthorized use has been detected, then the method 650 may move to the step 666.

In the step 666, the processors 106a-106n may generate the notification signal VCTRL that shows unauthorized use of the electronic device 520 and the detected license plate 460. In an example, the notification VCTRL may cause the communications device 110 to send video and/or images of the driver 202, the detected license plate 460 and/or the detected electronic device 530 (e.g., the signal PHONE_DET) to the authorities 630. The authorities 630 may decide whether to issue the driver 202 (or the owner of the detected vehicle detected based on the license plate 452) a ticket. Next, the method 650 may move to the step 668. The step 668 may end the method 650.

Figure 12:
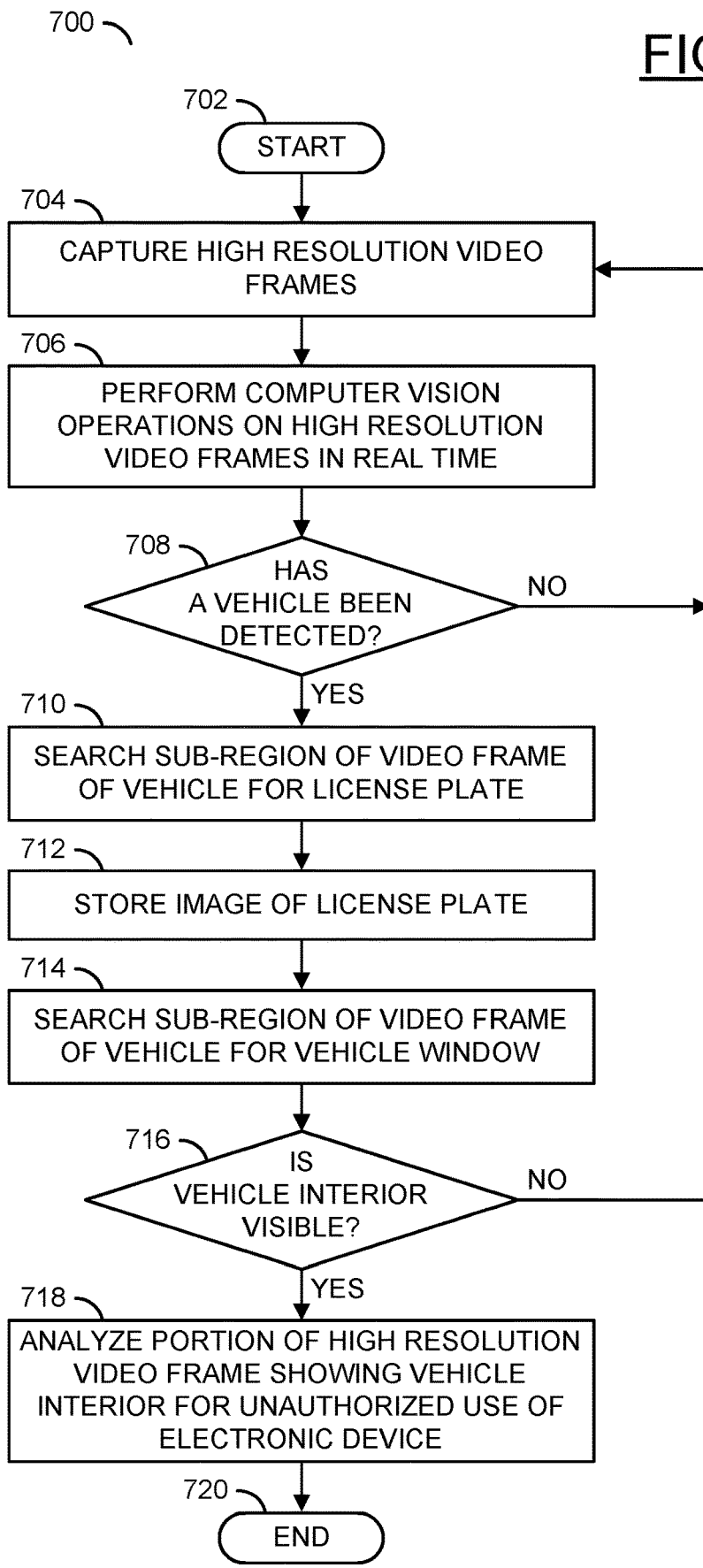
FIG. 12 is a flow diagram illustrating a method for detecting a license plate and analyzing a vehicle interior.

Referring to FIG. 12, a method (or process) 700 is shown. The method 700 may detect a license plate and analyze a vehicle interior. The method 700 generally comprises a step (or state) 702, a step (or state) 704, a step (or state) 706, a decision step (or state) 708, a step (or state) 710, a step (or state) 712, a step (or state) 714, a decision step (or state) 716, a step (or state) 718, and a step (or state) 720. The steps 702-720 may not represent a precise sequence of operations. The method 700 may comprise additional steps and/or intermediate steps. Each of the steps 702-720 may comprise more than one operation. The steps 702-720 may be performed in sequence, in parallel and/or partially in parallel. Not all of the steps 702-720 may be performed. The steps 702-720 may be examples of operations. Other operations may be performed.

The step 702 may start the method 700. In the step 704, the capture devices 102a-102n may capture high resolution video frames. In the step 706, the processors 106a-106n may perform the computer vision operations on the high resolution video frames in real time. For example, the processors 106a-106n may be configured to convert, encode, and/or prepare the video frames FRAMES_A-FRAMES_N for output while performing the computer vision operations. Next, the method 700 may move to the decision step 708.

In the decision step 708, the processors 106a-106n may determine whether one of the vehicles 430a-430n has been detected in the high resolution video frame (e.g., the video frame 450). If no vehicle has been detected, the method 700 may return to the step 704. If one or more of the vehicles 430a-430n has been detected, then the method 700 may move to the step 710.

In the step 710, the processors 106a-106n may search the sub-region of the video frame 450 that corresponds to the detected vehicle (e.g., the sub-region of the video frame 450 where the vehicle 430c is located as shown in association with FIG. 6), for the license plate 452. Next, in the step 712, the processors 106a-106n may store the detected license plate 460 (and an OCR value from the license plate 452), in the memory 108. In the step 714, the processors 106a-106n may search the sub-region of the video frame 450 for the vehicle window 454. In an example, by searching the sub-region of the video frame 450 for the license plate 452 and/or the window 454, the processors 106a-106n may avoid performing unnecessary calculations to search areas of the video frame 450 where the license plate 452 and/or the window 454 would never be located. Next, the method 700 may move to the decision step 716.

In the decision step 716, the processors 106a-106n may determine whether the vehicle interior 502 is visible. For example, the vehicle interior 502 may be visible if the driver 202 can be seen in the video frame 450. If the vehicle interior 502 is not visible, then the method 700 may return to the step 704. If the vehicle interior 502 is visible, then the method 700 may move to the step 718. In the step 718, the processors 106a-106n may analyze the high resolution video frame portion 500 showing the vehicle interior 502 for unauthorized use of the electronic device 520. In an example, by limiting the region of search to the high resolution video frame portion 500, the processors 106a-106n may avoid performing unnecessary calculations and focus the search to the locations of the high resolution video frame 450 where the electronic device 520 would potentially be located. Next, the method 700 may move to the step 720. The step 720 may end the method 700.

Referring to FIG. 13, a method (or process) 750 is shown. The method 750 may detect unauthorized use of an electronic device. The method 750 generally comprises a step (or state) 752, a step (or state) 754, a step (or state) 756, a decision step (or state) 758, a step (or state) 760, a step (or state) 762, a step (or state) 764, a decision step (or state) 766, a step (or state) 768, a step (or state) 770, a step (or state) 772, a decision step (or state) 774, a step (or state) 776, a step (or state) 778, and a step (or state) 780. The steps 752-780 may not represent a precise sequence of operations. The method 750 may comprise additional steps and/or intermediate steps. Each of the steps 752-780 may comprise more than one operation. The steps 752-780 may be performed in sequence, in parallel and/or partially in parallel. Not all of the steps 752-780 may be performed. The steps 752-780 may be examples of operations. Other operations may be performed.

The step 752 may start the method 750. Next, in the step 754, the processors 106a-106n may perform the computer vision operations on a portion of the video frames FRAMES_A-FRAMES_N showing the vehicle interior 502. In the step 756, the processors 106a-106n may determine the location of the detected hands 602 of the driver 552a. Next, the method 750 may move to the decision step 758.

In the decision step 758, the processors 106a-106n may determine whether the detected hands 602 are near the ear of the detected head 532a of the driver 552a. If the detected hands 602 are not near the ear, the method 750 may move to the step 760. In the step 760, the decision module 158 may decrease a confidence level of unauthorized use (e.g., the driver 552a is less likely to be talking on the phone if the phone 520 is not near an ear). Next, the method 750 may move to the step 764. In the decision step 758, if the detected hands 602 are near the ear, the method 750 may move to the step 762. In the step 762, the decision module 158 may increase a confidence level of unauthorized use (e.g., the driver 552a is more likely to be talking on the phone if the phone 520 is near an ear, but more proof may be needed to make a decision). Next, the method 750 may move to the step 764. In the step 764, the processors 106a-106n may search the vehicle interior 502 for the phone 520. Next, the method 750 may move to the decision step 766.

In the decision step 766, the processors 106a-106n may determine whether the phone 520 is in the hand 522 of the driver 552a. If the phone 520 is not in the hand 522 of the driver 552a, then the method 750 may move to the step 768. In the step 768, the decision module 158 may decrease a confidence level of unauthorized use (e.g., the driver 552a is less likely to be talking/texting on the phone if the phone 520 is not being held). Next, the method 750 may move to the step 772. In the decision step 766, if the phone 520 is in the hand 522 of the driver 552a, then the method 750 may move to the step 770. In the step 770, the decision module 158 may increase a confidence level of unauthorized use (e.g., the driver 552a is more likely to be talking/texting on the phone if the phone 520 is being held, but more proof may be needed to make a decision). Next, the method 750 may move to the step 772. In the step 772, the processors 106a-106n may analyze the detected mouth 610a of the driver 552a. Next, the method 750 may move to the decision step 774.

In the decision step 774, the processors 106a-106n may determine whether the detected mouth 610a is open. If the detected mouth 610a is open, then the method 750 may move to the step 776. In the step 776, the decision module 158 may increase a confidence level of unauthorized use (e.g., the driver 552a is more likely to be talking on the phone if the mouth is open). Next, the method 750 may move to the step 780. In the decision step 774, if the detected mouth 610a is not open, the method 750 may move to the step 778. In the step 778, the decision module 158 may decrease a confidence level of unauthorized use. Next, the method 750 may move to the step 780. The step 780 may end the method 750.

The aggregated confidence level (e.g., a summation of all the increases and decreases of the confidence level after weighting is performed based on the particular factor) may be used by the decision module 158 to make a determination of whether there has been an unauthorized use of the electronic device 520. In one example, the detected phone 520 behind held by the driver 552a may be strong evidence of unauthorized use (e.g., strong evidence may have a higher weighting factor when aggregating the confidence level). In another example, detecting that the mouth 610a is open may be weak evidence of unauthorized use (e.g., weak evidence may have a lower weighting factor when aggregating the confidence level).

The method 750 may provide some examples of characteristics that the processors 106a-106n may check to determine the unauthorized use. The number and/or types of factors checked may be varied based on the amount of time and/or number of frames captured that the vehicle is detected. For example, if multiple video frames are available, then the processors 106a-106n may check whether the mouth is moving (e.g., stronger evidence than checking if the mouth is open), and/or how long the hand 522 has been held up to the ear of the driver 552a. The factors checked and/or the amount of weighting applied to each factor may be varied according to the design criteria of a particular implementation.

Figure 14:
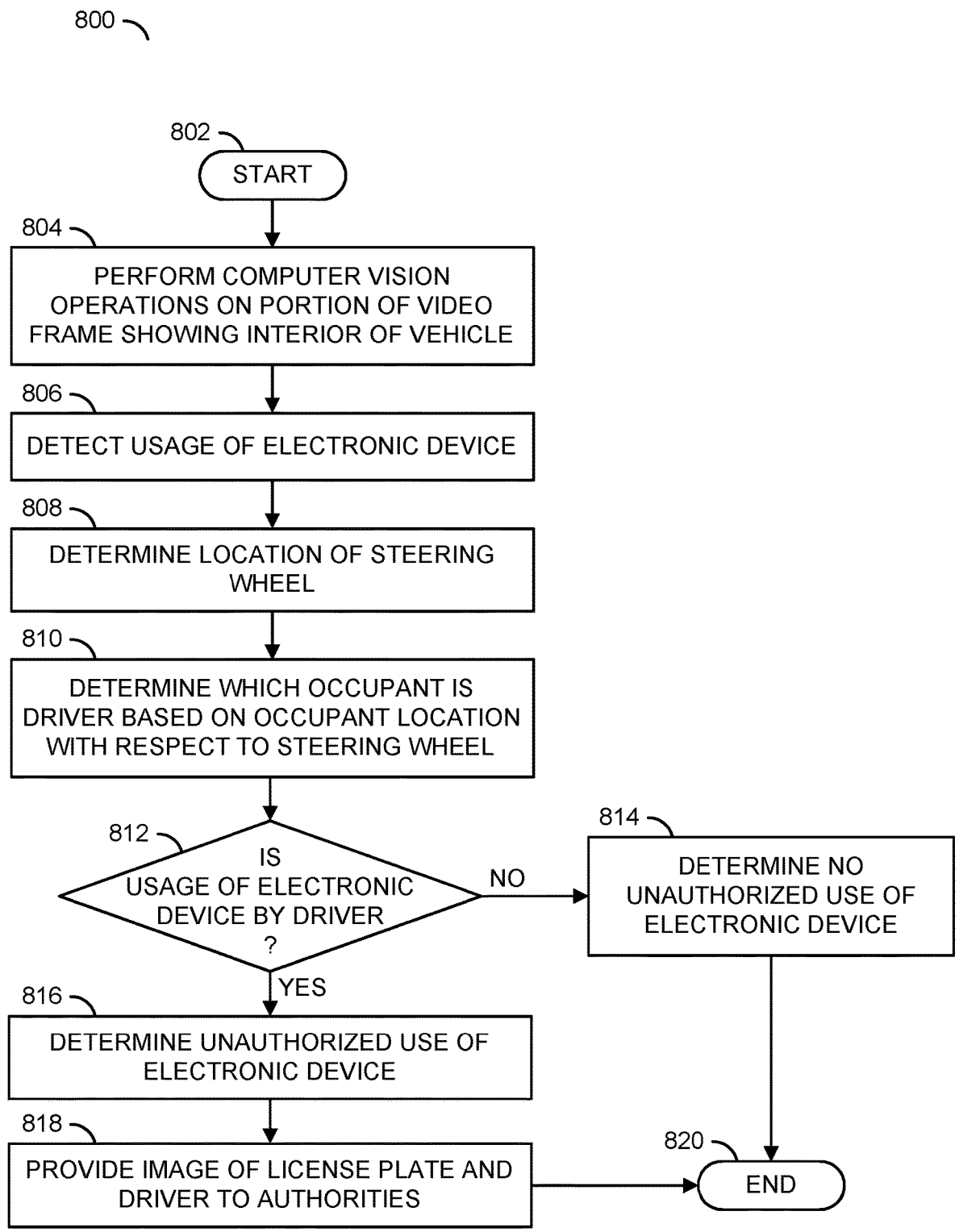
FIG. 14 is a flow diagram illustrating a method for distinguishing between use of an electronic device by a driver and a passenger of a vehicle.

Referring to FIG. 14, a method (or process) 800 is shown. The method 800 may distinguish between use of an electronic device by a driver and a passenger of a vehicle. The method 800 generally comprises a step (or state) 802, a step (or state) 804, a step (or state) 806, a step (or state) 808, a step (or state) 810, a decision step (or state) 812, a step (or state) 814, a step (or state) 816, a step (or state) 818, and a step (or state) 820. The steps 802-820 may not represent a precise sequence of operations. The method 800 may comprise additional steps and/or intermediate steps. Each of the steps 802-820 may comprise more than one operation. The steps 802-820 may be performed in sequence, in parallel and/or partially in parallel. Not all of the steps 802-820 may be performed. The steps 802-820 may be examples of operations. Other operations may be performed.

The step 802 may start the method 800. In the step 804, the processors 106a-106n may perform the computer vision operations on the video frame portion 600 showing the vehicle interior 502'. Next, in the step 806, the processors 106a-106n may determine whether there is usage of the electronic device 520 by one or more of the occupants 552a-552b. In the step 808, the processors 106a-106n may determine the location of the steering wheel 504.

Next, in the step 810, the processors 106a-106n may determine which of the occupants 552a-552b is the driver 202 based on the location of the occupant with respect to the steering wheel detection 554. In an example, the detected heads 532a-532b may be a sufficient proxy for the location of the occupants 552a-552b (e.g., the particular one of the heads 532a-532b that is located in front of the steering wheel detection 554 may be the driver 202). Next, the method 800 may move to the decision step 812.

In the decision step 812, the processors 106a-106n may determine if the usage of the electronic device 520 is by the driver 202. If the usage of the electronic device 520 is not by the driver 202, then the method 800 may move to the step 814. In the step 814, the decision module 158 may determine that there is no unauthorized use of the electronic device 520. Next, the method 800 may move to the step 820.

In the decision step 812, if the usage of the electronic device 520 is by the driver 202, then the method 800 may move to the step 816. In the step 816, the decision module 158 may determine that there is unauthorized use of the electronic device 520. Next, in the step 818, the processors 106a-106n may generate the signal VCTRL to enable communication of an image (e.g., the signal PHONE_DET) comprising the license plate detection 460 and the driver 202 using the electronic device 520. Next, the method 800 may move to the step 820. The step 820 may end the method 800.

The unauthorized use of the electronic device 520 by the driver 202 may not be limited to the electronic device 520 being in the hand 522 of the driver 202. Generally, unauthorized use of the electronic device 520 may comprise use of the electronic device 520 that distracts the driver 202 from paying attention to the road (e.g., the eyes 534a-534b are not looking at the road). In an example, if the passenger 552b is holding the electronic device 520 for the driver 202 and the driver 202 is looking at the electronic device 520 instead of the road, the processors 106a-106n may determine that there is unauthorized use of the electronic device 520 (even without the electronic device 520 being held by the driver 202).

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    an interface configured to receive pixel data; and
    a processor configured to (i) process said pixel data arranged as video frames, (ii) perform video operations on said video frames to detect objects in said video frames, (iii) calculate descriptors from said video frames to determine (a) a first subregion of said video frames that comprises a license plate of a vehicle and (b) a second subregion of said video frames that comprises a driver of said vehicle, (iv) detect said license plate in response to said detected objects in said first subregion, (v) detect a use of an electronic device by said driver in response to said detected objects in said second subregion and (vi) generate a notification signal, wherein
        (a) said notification signal comprises data to enable correlating said driver using said electronic device in said vehicle with said license plate,
        (b) said notification signal is generated in response to determining an unauthorized use of said electronic device and
        (c) said processor comprises a dedicated hardware module configured to perform feature detection to calculate said descriptors for determining pixels of said video frames that belong to said first subregion and said second subregion.

2. The apparatus according to claim 1, wherein said notification signal is communicated to authorities.

3. The apparatus according to claim 2, wherein (i) said authorities comprise a police service and (ii) said notification signal is used as evidence to confirm that said use of said electronic device is unauthorized to support said authorities providing a ticket.

4. The apparatus according to claim 3, wherein said ticket is issued to a person based on said license plate.

5. The apparatus according to claim 1, wherein (i) said notification signal comprises at least one image of said driver performing said use of said electronic device that is unauthorized and (ii) said license plate of said vehicle.

6. The apparatus according to claim 5, wherein said image and said license plate are provided to enable a person to double check whether said use of said electronic device by said driver is unauthorized.

7. The apparatus according to claim 1, wherein said apparatus is implemented in an ego vehicle and said vehicle captured by said video frames comprises one or more other vehicles in traffic.

8. The apparatus according to claim 1, wherein said processor and said dedicated hardware module are configured to implement a neural network configured to perform object recognition to detect said objects by analyzing said video frames.

9. The apparatus according to claim 1, wherein said apparatus is implemented at a fixed location and said vehicle captured by said video frames comprises one or more vehicles driving near said fixed location.

10. The apparatus according to claim 9, wherein said fixed location is a traffic light.

11. The apparatus according to claim 1, wherein said use of said electronic device is unauthorized in response to determining that said driver is talking using said electronic device.

12. The apparatus according to claim 1, wherein said use of said electronic device is unauthorized in response to determining that said driver is texting using said electronic device.

13. The apparatus according to claim 12, wherein texting using said electronic device is determined by (a) performing said video operations on (i) a first of said video frames comprising a head of said driver and (ii) a second of said video frames comprising a hand of said driver and (b) making inferences based on said video operations performed on both said first of said video frames and said second of said video frames.

14. The apparatus according to claim 1, wherein said electronic device is a smartphone.

15. The apparatus according to claim 1, wherein said processor is configured to determine which of a plurality of passengers of said vehicle is said driver in response to detecting a location of a steering wheel with respect to a location of said passengers within said vehicle.

16. The apparatus according to claim 1, wherein (i) said video frames comprise high resolution video frames having a resolution of at least 1080p and (ii) said dedicated hardware module enables performing said video operations on said high resolution video frames in real time.

17. The apparatus according to claim 1, wherein said processor is configured to limit searching for said license plate to said first subregion and limit searching for said use of said electronic device by said driver to said second subregion in order to efficiently utilize resources of said processor.

18. The apparatus according to claim 1, wherein said processor is further configured to perform local masking to said first subregion and said second subregion.

19. The apparatus according to claim 1, wherein said second subregion comprises a portion of said video frames that correspond to a windshield.

20. The apparatus according to claim 1, wherein said dedicated hardware module is configured to compare said descriptors calculated from said video frames to learned descriptors determined from training data.

* * * * *